United States Patent
Fowler

(10) Patent No.: US 9,052,109 B1
(45) Date of Patent: Jun. 9, 2015

(54) PYROLYTIC GAS PROCESSOR AND TIRE CONVERSION SYSTEM THEREFROM

(71) Applicant: Infinitus Renewable Energy, LLC, Plantation, FL (US)

(72) Inventor: David W. Fowler, Orange Beach, AL (US)

(73) Assignee: Infinitus Renewable Energy, LLC, Plantation, FL (US)

( * ) Notice: Subject to any disclaimer, the term of this patent is extended or adjusted under 35 U.S.C. 154(b) by 0 days.

(21) Appl. No.: 14/569,030

(22) Filed: Dec. 12, 2014

(51) Int. Cl.
| F23N 1/02 | (2006.01) |
| F23G 5/027 | (2006.01) |
| F23G 5/44 | (2006.01) |
| F23G 5/50 | (2006.01) |
| F23G 7/12 | (2006.01) |
| C10B 53/07 | (2006.01) |

(52) U.S. Cl.
CPC .......... *F23G 5/027* (2013.01); *F23G 5/444* (2013.01); *F23G 5/50* (2013.01); *F23G 7/12* (2013.01); *F23G 2209/281* (2013.01); *F23G 2201/80* (2013.01); *C10B 53/07* (2013.01)

(58) Field of Classification Search
CPC ..................................................... C10B 53/07
USPC .............. 431/10, 12, 165, 187, 195; 202/109; 422/78
See application file for complete search history.

(56) References Cited

U.S. PATENT DOCUMENTS

| 4,257,762 | A | * | 3/1981 | Zink et al. ...................... 431/177 |
| 5,511,970 | A | * | 4/1996 | Irwin et al. ........................ 431/9 |
| 5,720,232 | A | | 2/1998 | Meador |
| 6,029,647 | A | * | 2/2000 | Pisano et al. ................. 126/91 A |
| 7,329,329 | B2 | | 2/2008 | Masemore et al. |
| 8,480,769 | B2 | | 7/2013 | D'Agostini |
| 2003/0010266 | A1 | * | 1/2003 | Ballantine et al. ............ 110/229 |
| 2010/0289270 | A1 | * | 11/2010 | Behrens et al. ................ 290/1 A |
| 2011/0223549 | A1 | | 9/2011 | Cantu et al. |
| 2012/0122046 | A1 | | 5/2012 | Tsantrizos et al. |
| 2014/0234787 | A1 | | 8/2014 | De La Sovera |

FOREIGN PATENT DOCUMENTS

| DE | 102005001569 | * | 7/2006 |
| EP | 1241409 A2 | * | 9/2002 |

* cited by examiner

*Primary Examiner* — Kenneth Rinehart
*Assistant Examiner* — Gajanan M Prabhu
(74) *Attorney, Agent, or Firm* — Jetter & Associates, P.A.

(57) ABSTRACT

A gas processor includes a burner chamber including a first end and a second end, a gas/fuel burner having an inlet receiving air and an inlet for receiving a first combustible gas including a nozzle providing a flame extending out from the nozzle. A syn-gas chamber including injection holes and a syn-gas feed line and a syn-gas nozzle plate is coupled between the second end of the burner chamber and the gas/fuel burner including over the nozzle, wherein syn-gas is directed by the injection holes into a path of the flame for combustion of the syn-gas. An air pipe having a plurality of air discharge ports extending from the first end to within the burner chamber having an air blower coupled thereto is configured to pump air into the burner chamber.

14 Claims, 21 Drawing Sheets

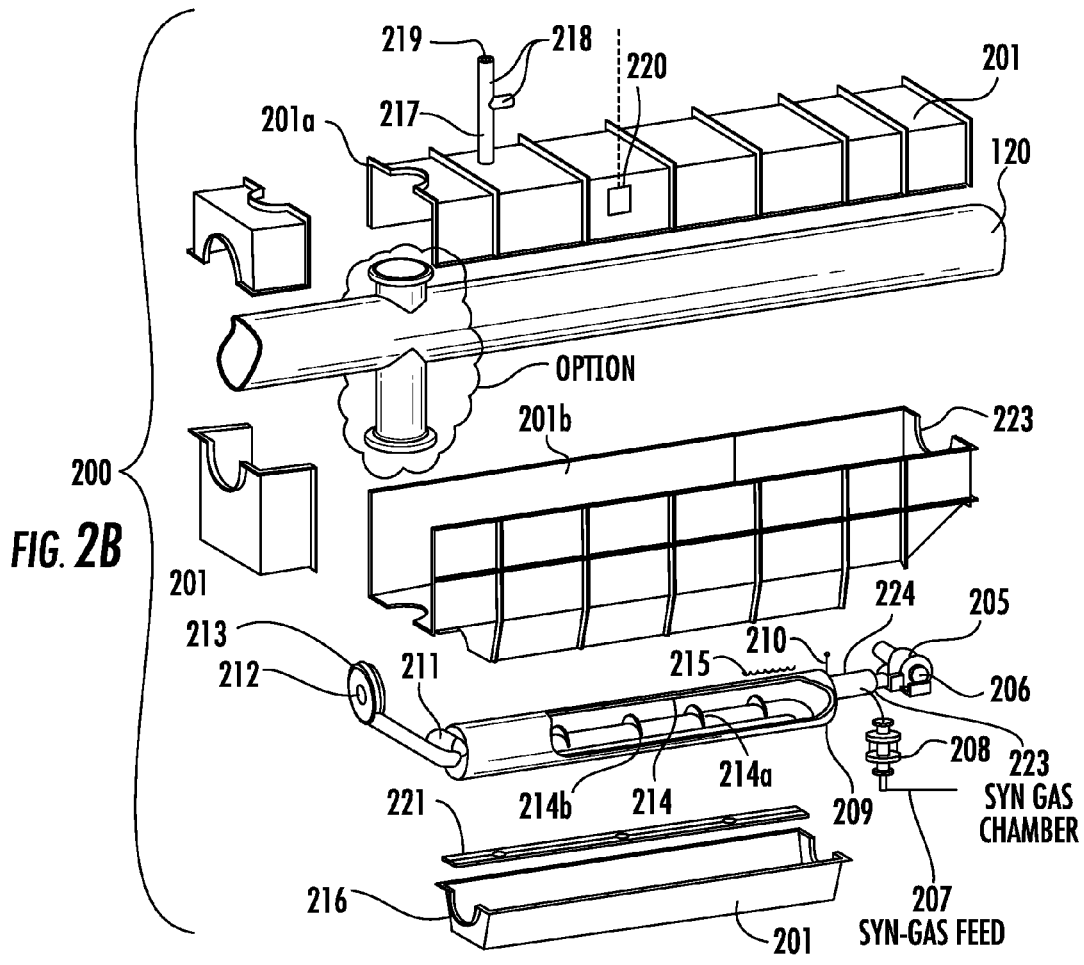
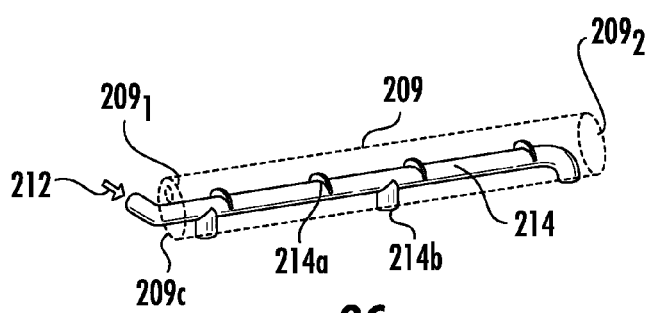
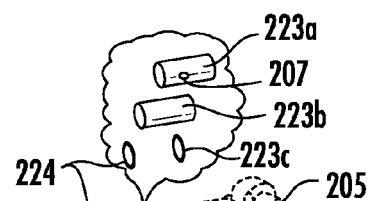
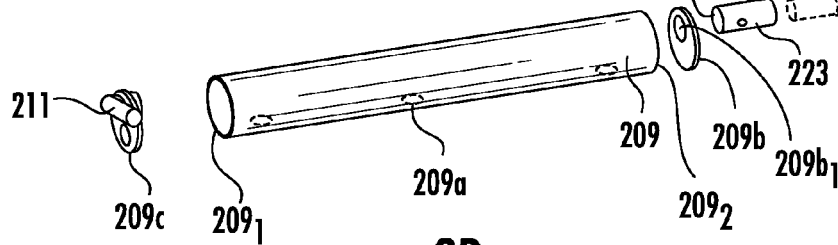
FIG. 2B
FIG. 2C
FIG. 2D

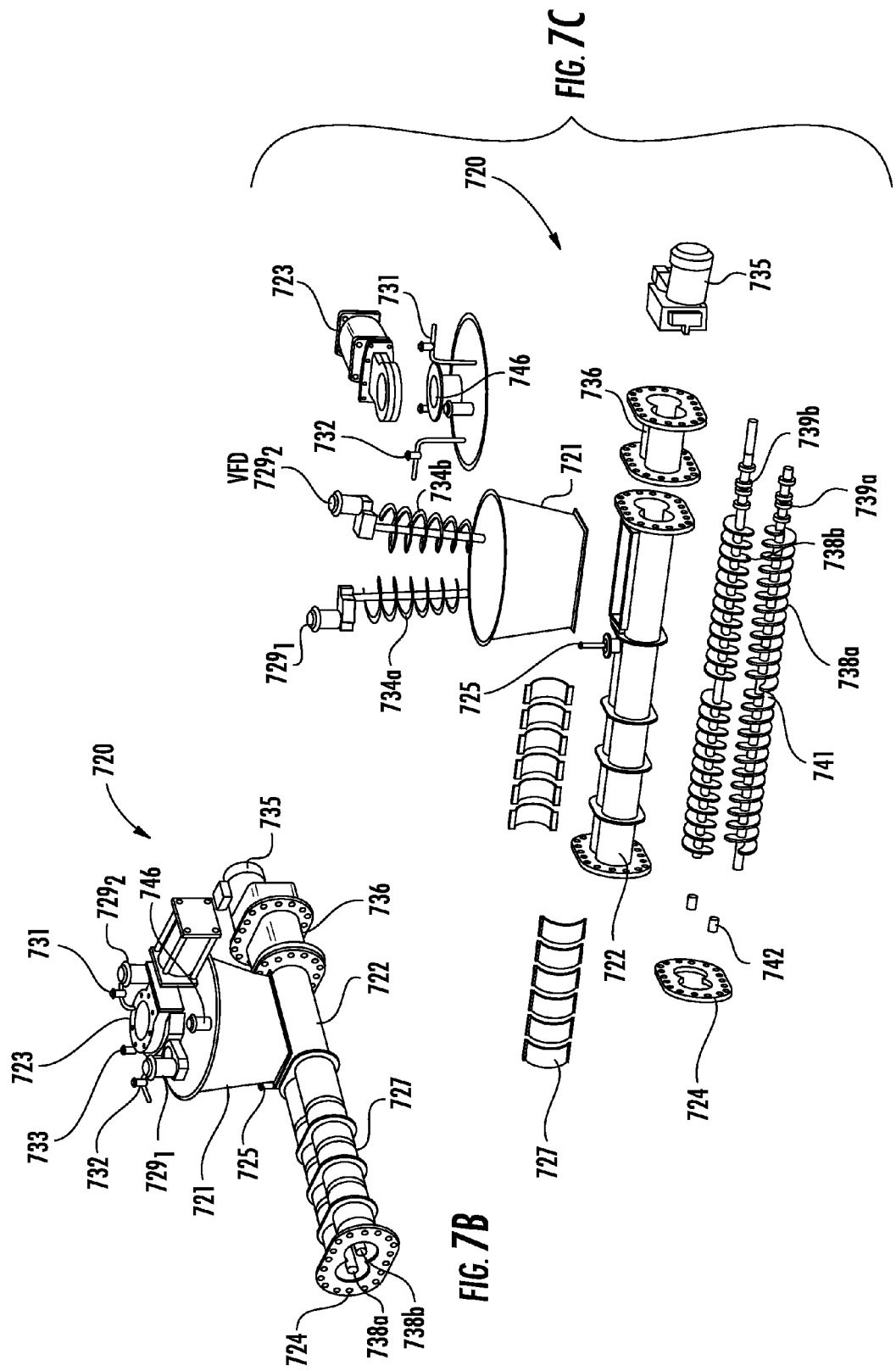

PYROLYTIC GAS PROCESSOR AND TIRE CONVERSION SYSTEM THEREFROM

FIELD

Disclosed embodiments relate to pyrolytic gas processors and tire conversion apparatus therefrom.

BACKGROUND

Systems and methods are known for tire recycling where discarded tires that are cut into pieces (tire crumb) that are processed in a reactor chamber configured for pyrolysis processing under a slight vacuum in an essentially oxygen-free atmosphere to generate carbon char, steel, and hydrocarbon oils and gases. Some of the gases referred to as pyrolytic gases or syn-gas have 4 or less carbons (≤C4) are generated when a carbon-based bio-mass is thermo-cracked have boiling points too low to condense into a liquid using conventional condensation processing.

FIG. 1 is a simplified depiction of a conventional pyrolytic tire conversion system (tire conversion system) 100 including a feed mechanism 110 for feeding the tire material (tire crumb) into an inlet 120a of the reactor chamber 120 essentially without letting air (oxygen) in the inlet. A mechanism for conveying the material through the reactor chamber 120 is provided to vaporize the tire material into vapors and for conveying solid material including carbon char and steel. The reactor chamber 120 includes a flue pipe 120c for releasing vapors generated and another output 120b for releasing the pyrolized solid material generated. The vapors exiting the flue pipe 120c include hydrocarbons having entrained ash particles.

The vapors having entrained ash particles after exiting the flue pipe 120c are cooled by a heat exchanger/condenser shown as a fuel condenser 130 to liquefy a portion of it to provide liquid fuel that is collected in a collection tank 140, with the non-condensable portion being a gas mixture generally being C4 or below which is directed to a flaring apparatus 150 for flaring these gases. The liquid fuel is generally pumped away from the collection tank 140, where the fuel may then be filtered in an additional step to remove the ash particles. The solid material generated including carbon char and steel is generally discharged from the output 120b of the reactor chamber 120 via a screw conveyor (e.g., outlet auger) 125 (which may also provide char removal) that is typically air locked from the vacuum in the reactor chamber 120 by valves or gates, and the solid material is transferred through a housing to a closed bin (recovery hopper) 145.

SUMMARY

This Summary is provided to introduce a brief selection of disclosed concepts in a simplified form that are further described below in the Detailed Description including the drawings provided. This Summary is not intended to limit the claimed subject matter's scope.

A gas processor includes a burner chamber including a first end and a second end, a gas/fuel burner having an inlet receiving air and another inlet for receiving a first combustible gas including a nozzle providing a flame extending out from the nozzle. A syn-gas chamber having injection holes including a syn-gas feed line and a syn-gas nozzle plate is coupled between the second end of the burner chamber and the gas/fuel burner including over the nozzle. The syn-gas is directed by the injection holes into a path of the flame for combustion of the syn-gas, and an air pipe having a plurality of air discharge ports extending from the first end to within the burner chamber having an air blower coupled thereto is for pumping air into the burner chamber. In one arrangement, disclosed gas processors are integrated into a system for pyrolyzing tires where burner chamber of the gas processor is positioned proximate to a reactor chamber of the system to provide radiant heat for heating the reactor chamber.

BRIEF DESCRIPTION OF THE DRAWINGS

Reference will now be made to the accompanying drawings, which are not necessarily drawn to scale, wherein:

FIG. 2B is an exploded view of the example gas processor depicted in FIG. 2A.

FIG. 2C shows example details for an example fresh air pipe within a burner chamber, according to an example embodiment.

FIG. 2D shows some example details of the coupling between gas/fuel burner, syn-gas chamber and the burner chamber, according to an example embodiment.

FIG. 3C shows an example syn-gas chamber having injection holes coupled between a gas/fuel burner and a burner chamber, while

FIG. 7B shows further details for an example force feed auger, and FIG. 7C shows a Variable Frequency Drive (VFD) coupled to a power gear box that drives agitator screws, all according to example embodiments.

FIG. 9B shows another ORCC that is used to explain tube thermal expansion advantages of disclosed ORCC's, while

DETAILED DESCRIPTION

Figure 1:
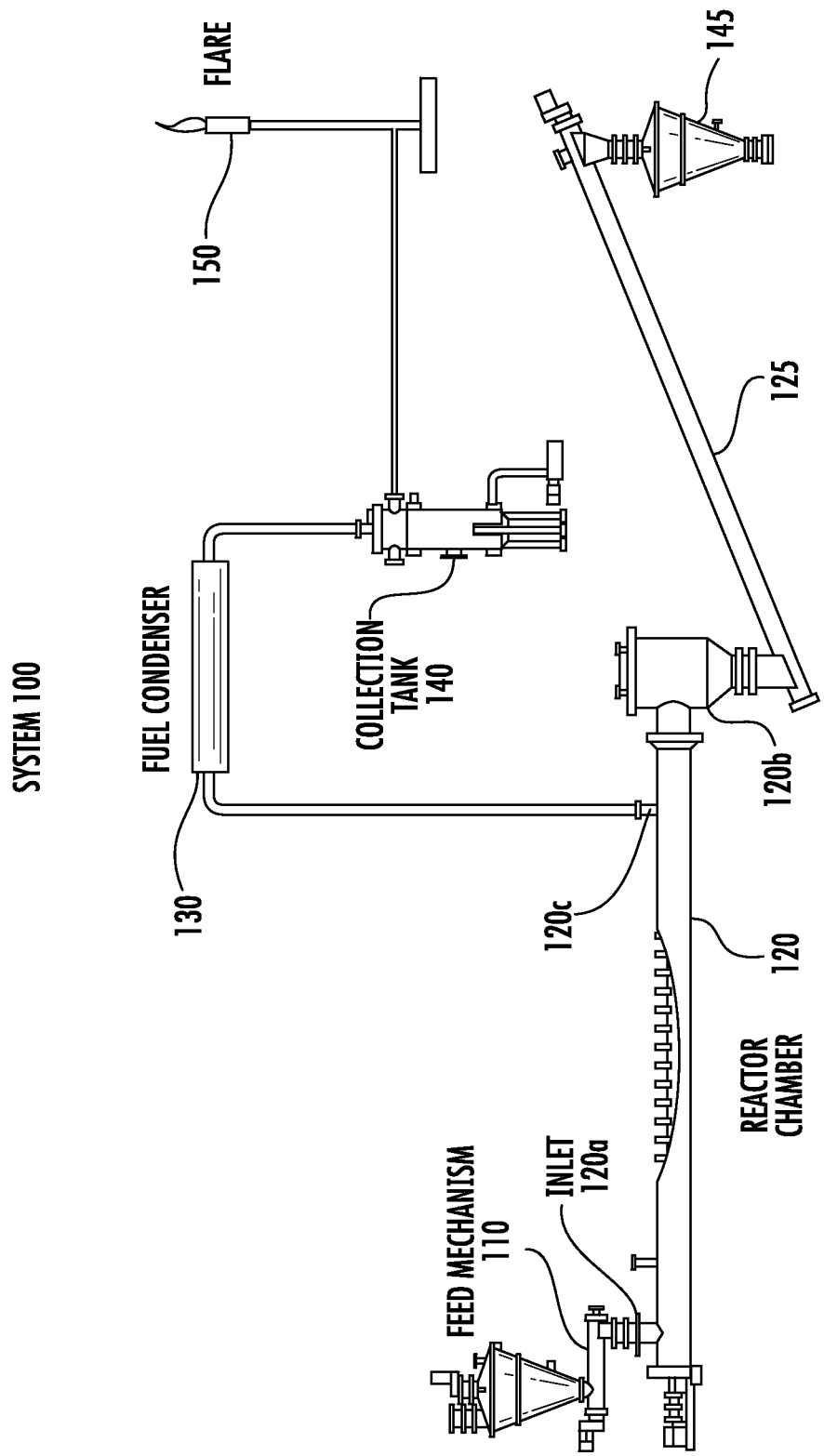
FIG. 1 is a simplified depiction of a conventional pyrolytic tire conversion system.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

One disclosed embodiment is a pyrolytic gas processor (gas processor) that functions as a convection oven heater source which utilizes generally non-liquefiable combustible pyrolytic gasses ($\leq C4$) referred to herein as "syn-gas" generated from terminal cracking of bio-mass products that are generally not-utilized, including but not limited to from cracking of tire crumb. Disclosed gas processors provide at least a portion of the heat needed for operation of process equipment including reactor chambers. For example, disclosed gas processors can be used as a heat source by integrating it into a tire recycling system, such as shown as gas processor 200 in the tire conversion system 400 shown in FIG. 4 described below to heat the reactor chamber 120, or others apparatus or systems where heat is utilized for a given process.

It is common for various manufacturers to terminal crack or distill bio-mass or petroleum oils into lighter fuels to generate a combustible gas including mostly syn-gas. In some systems the syn-gas is close in composition to natural gas (primarily methane, $CH_4$) that is commercially sold in countries such as the United States. Usually this syn-gas is not the primary product of the manufacturer and is considered a waste product, although it is recognized herein to be high in energy content reflected in its BTU value. The expense of conventional equipment to utilize this syn-gas (generators, boilers) is generally very high, so less expensive ways are commonly used. A flare stack such as shown in FIG. 1 as flaring apparatus 150 may be used to incinerate the syn-gas. For example, in process industries such as petroleum (oil) refineries and petrochemical plants, it is a common practice to burn the exhaust syn-gas of a stage of the refinery or plant with a steam-assisted, combustible gas assisted or air assisted flare tip before releasing them to the atmosphere in order to reduce the environment pollution in a process generally referred to as "flaring".

However, disclosed gas processor embodiments recognize a flare stack utilizes a short exposure time and thus "wastes" the heat generated from burned syn-gas. Venting to the atmosphere is also generally prohibited by laws associated with the United States environmental protection agency (EPA). Incineration chambers are known for burning the gas, but like the flare stack, an incineration chamber does not utilize the heat energy generated.

Figure 2A:
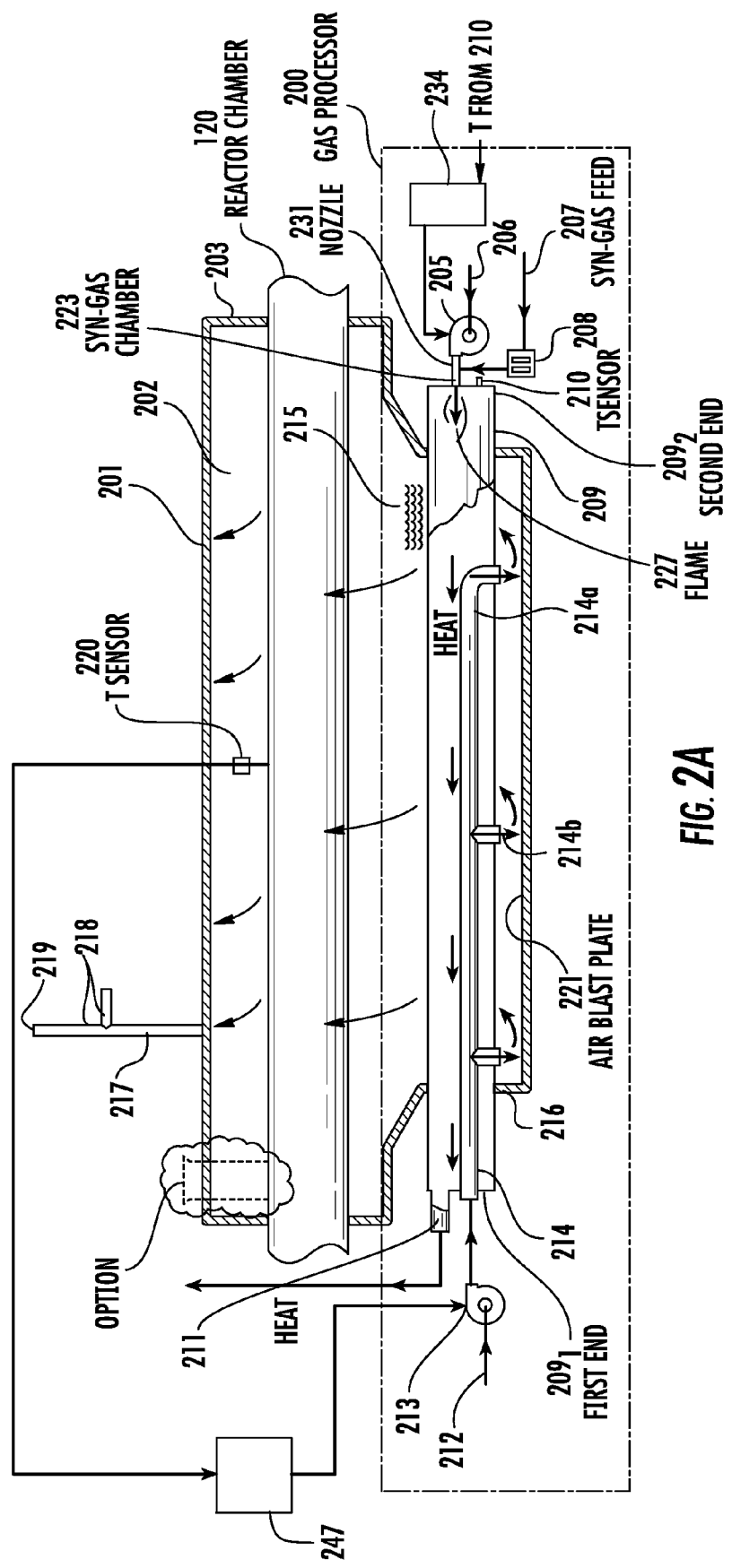
FIG. 2A is a depiction of an example gas processor including a gas/fuel burner having an inlet receiving a combustible gas configured to generate a flame which burns a different combustible gas provided referred to as a "syn-gas" in a syn-gas chamber that is coupled to a burner chamber to provide radiant heat to process equipment shown as a reactor chamber, where the burner chamber has a fresh air blower/fan which provides atmospheric air through a fresh air pipe in the burner chamber operable for removing heat from the burner chamber, according to an example embodiment.

FIG. 2A is a depiction of an example gas processor 200 according to an example embodiment. Gas processor 200 includes a gas/fuel burner 205 including an inlet coupled to receive a combustible gas that is configured to generate a flame 227 out from its nozzle 231 that is within a syn-gas chamber 223 which is coupled to a burner chamber 209, where the flame 227 burns a different combustible gas composition referred to herein as a "syn-gas". The flame 227 generally extends into the burner chamber 209 as shown. Burner chamber 209 includes a first end $209_1$ and a second end $209_2$. The burner chamber 209 has a fresh air blower/fan 213 which provides atmospheric air through a fresh air pipe 214 that is within the burner chamber 209.

By including a fresh air blower/fan 213 that provides atmospheric air through a fresh air pipe 214 into the first end $209_1$ of the burner chamber 209, heat is removed from the burner chamber 209 which is utilized to provide radiant heat 215 to process equipment shown by example as a reactor chamber 120 in FIG. 2A. The burner chamber 209 may be secured proximate to the reactor chamber 120 (typically about 6 to 24 inches away, e.g., about 12 inches) by mounting on a slide collar on one end to allow for thermo expansion from the reactor chamber 120.

FIG. 2B is an exploded view of the example gas processor 200 depicted in FIG. 2A. The reactor chamber 120 includes a temperature sensor 220 there over having a connector extending out from a metal fabricated heat box (hereafter "heat box") 201 surrounding the reactor chamber 120 and burner chamber 209 to sense a temperature in the reactor chamber 120. The reactor ports "option" shown in FIGS. 2A and 2B allows for different inlet locations to the reactor chamber 120.

The fresh air pipe 214 has a plurality of protruding features referred to as fins 214a that function to increase the absorption of heat into the skin of the fresh air pipe 214. This feature is recognized to increase the efficiency of heat transfer. The fins 214a can have a height dimension of about 0.8× to 1.2× the diameter of the air pipe 214. These fins 214a also disrupt the airstream and thus beneficially slow the air flow inside the burner chamber 209. The slower the flow rate of the heated air, the longer the exposure time and the more thoroughly contaminates in the syn-gas are destroyed.

The fresh air 212 interning into the heat box 201 by the fresh air pipe 214 discharged by the fresh air pipe discharge ports (pipe discharge ports) 214b is distributed essentially evenly under the burner chamber 209 by the air blast plate 221 shown. This distribution of fresh air wraps around the outside skin of the burner chamber 209 and removes heat. This heat is pushed into the heat box 201 and adds or takes away heat from the reactor chamber 120 based on the amount of fresh air 212 pushed into the fresh air pipe 214. The air blast plate 221 has baffles located under the pipe discharge ports 214b. These baffles function to divide the air volume more evenly. The air blast plate 221 also prevents the board insulation 202 from being damaged.

The removal of heat from the burner chamber 209 by the fresh air 212 introduced through the fresh air pipe 214 that becomes heated air provides radiant heat 215 which reaches the reactor chamber 120 which may be associated with a tire recycling apparatus such as tire conversion system 100 shown in FIG. 1. Moreover, as described above, removal of heat from the burner chamber 209 by the fresh air 212 also provides the benefit of reducing the heat build-up in the burner chamber 209 during system operations.

The amount of radiant heat 215 provided to reactor chamber 120 can be controlled to a temperature set point by adjusting the speed of the fresh air fan 213 with a variable frequency drive (speed control). The increase or decrease in fan speed of the fresh air fan 213 controls the volume of fresh air 212 which is pushed through the fresh air pipe 214. Accordingly, a change of volume of the fresh air 212 can be used to reduce or increase the temperature of the radiant heat 215 where the fan speed of the fresh air blower/fan can be used to control the needed amount of radiant heat 215 for operation of the reactor chamber 120.

A fan controller 247 is shown in FIG. 2A coupled to receive a temperature reading from a temperature sensor 220 located at the top of the heat box 201 over the reactor chamber 120. Fan controller 247 is configured to regulate the flow of fresh air 212 pushed through the fresh air pipe 214 by the fresh air blower 213.

Besides temperature sensor 220, gas processor 200 generally also includes a second temperature sensor 210 shown in FIG. 2B that is associated with the gas/fuel burner 205. A standard burner that can be used for gas/fuel burner 205 generally includes a limit and control temperature sensor. The temperature sensor provided by a limit and control temperature sensor can be used as the temperature sensor 210. The limit and control temperature sensor are generally interlocked with the burner controller 234 shown in FIG. 3B described below. The burner air controller 234 supplied with the gas/fuel burner 205 can modulate the amount of fresh air entering inlet 206 entering the gas/fuel burner 205 using a damper 243 (shown in FIG. 3B) and flow of natural gas or other supplied fuel for the gas/fuel burner 205 to maintain the temperature set point using readings from the temperature sensors 210 for control of the gas/fuel burner 205.

The gas/fuel burner 205 pushes spent gas and syn-gas through the burner chamber 209 and out the burner flue pipe 211 shown in FIG. 2A. The heated air provided by gas processor 200 out from the burner flue pipe 211 is generally safe to use in the environment. Although shown heating the reactor chamber 120, the radiant heat 215 can be alternatively be used for a variety of other purposes including to heat a manufacturing plant, run an electric generator, or generate steam. Reactor chamber 120 is shown including a hot air flue pipe 217, air diverters 218 and a flue 219 to the outside. The air diverter 218 can be computerized to maintain the output volume or temperature needed for other uses. The remainder of the unused hot fresh air provided from the burner flue pipe 211 can be cooled and returned into the manufacturing plant or vented to the outside.

The burner flue pipe 211 exhausts outside and generally needs to be permitted by the EPA. The air flue pipe 217 exhausts hot clean air via heat exchange provided by the fresh air pipe 214 in conjunction with the burner chamber 209. Fresh air 212 coming from the room propelled by fresh air blower 213 pushes through the heated fresh air pipe 214 in the burner chamber 209 via pipe discharge port(s) 214b into the heat box 201 then out the air flue pipe 217.

FIG. 2C shows details for an example fresh air pipe 214 within the burner chamber 209, according to an example embodiment. The fresh air pipe 214 is shown extending out from an end plate 209c on the first end $209_1$ of the burner chamber 209 generally to at least ½ the length of the burner chamber 209. A fresh air pipe discharge port 214b is shown that as described below which provides air to the air blast plate 221 shown in FIG. 2A located under the burner chamber 209.

FIG. 2D shows some details regarding the coupling between gas/fuel burner 205, syn-gas chamber 223 and the second end $209_2$ of the burner chamber 209, according to an example embodiment. Reference 209a in burner chamber 209 is an opening for the fresh air pipe discharge port 214b. Reference 209c is a burner chamber end plate and 211 is the burner flue pipe. The exploded view portion of the syn-gas chamber 223 provided shows a syn-gas chamber housing 223a, a chamber tube 223b a chamber end cap 223c and a syn-gas nozzle plate 224. Reference 209b is a burner chamber inlet plate that includes an aperture $209b_1$ that allows the flame 227 to extend into the second end $209_2$ of the burner chamber 209.

Figure 3A:
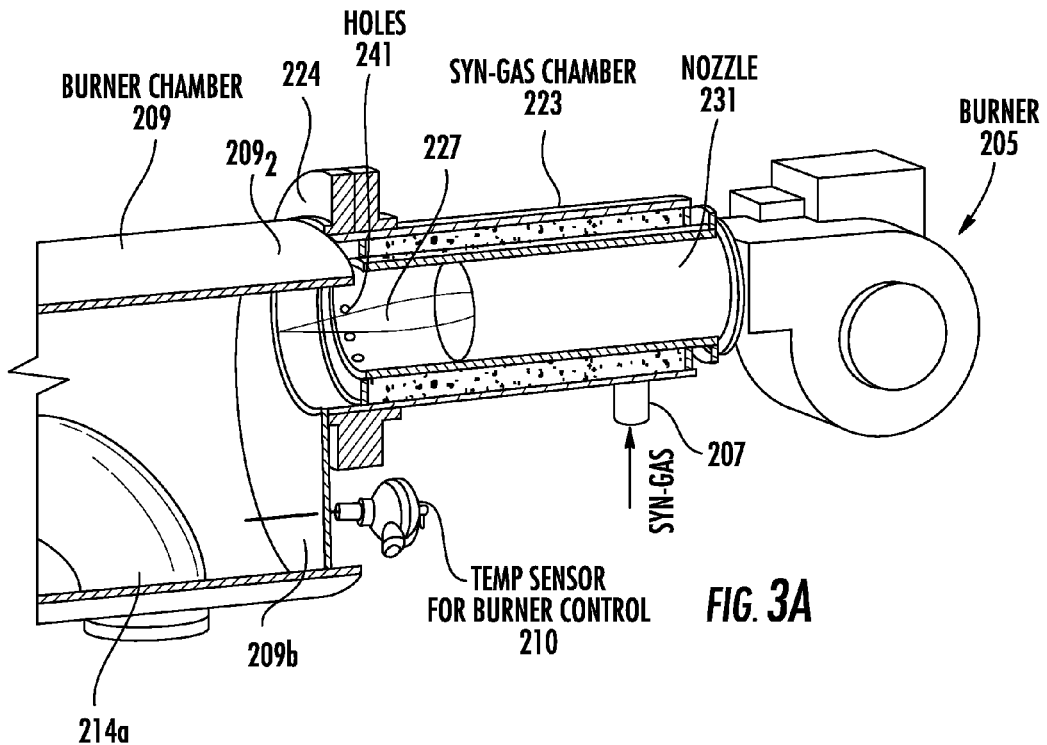
FIG. 3A shows example details regarding the relationship between the gas/fuel burner, syn-gas chamber and the burner chamber, with the syn-gas chamber and burner chamber shown in cut-away, according to an example embodiment.

FIG. 3A shows example details regarding the relationship between the gas/fuel burner 205, syn-gas chamber 223 and the burner chamber 209, with the syn-gas chamber 223 and burner chamber 209 shown in cut-away. There is a syn-gas nozzle plate 224 on the end of the syn-gas chamber 223, and syn-gas chamber injection ports (injection holes) 241 are provided for injecting syn-gas into the flame 227 shown emerging from the nozzle 231 in the syn-gas chamber 223. A syn-gas feed line 207 is shown that is generally supplied by a pyrolytic gas source (≤C4), such as by a pressure tank (e.g., see pressure tank 410 holding syn-gas shown in FIG. 4 described below). A temperature sensor 210 for sensing the temperature in the burner chamber 209 is shown that together with the burner air controller 234 shown in FIG. 2A which receives a temperature reading from the temperature sensor 210 is configured to regulate the flow of air into the gas/fuel burner 205, such as using the modulation damper 243 shown in FIG. 3B described below.

The syn-gas chamber 223 is shown having example coaxial metals cylinders providing a syn-gas injection arrangement where syn-gas received from the syn-gas feed line 207 travels in the gap between the metals cylinders before being injected through the injection holes 241 near the syn-gas nozzle plate 224 at the end of the syn-gas chamber 223 opposite the gas/fuel burner 205. The syn-gas is generally injected at least about 6 inches from the start of the flame 227 within the nozzle 231, otherwise the flame 227 may tend to blow out during operation. Although shown injected from injection holes 241 near the syn-gas nozzle plate 224 by a coaxial arrangement that involves lateral movement of the syn-gas before injection into the syn-gas chamber 223, the syn-gas may be injected using other injection arrangements into the syn-gas chamber 223 provided the flame 227 has at least about 6 inches flowing in the syn-gas chamber 223 before experiencing the syn-gas.

Gas processor 200 generally provides efficient operation by generating a relatively high level of radiant heat 215 for a relatively low level of natural gas or other combustible gas fuel used to generate the flame 227. In typical operation of gas processor 200, the mass flow of the natural gas or other combustible gas used as fuel to initially generate the flame 227 is generally significantly less than the mass flow of the syn-gas being burned by the flame 227. Moreover, it may be possible once the syn-gas is burning to at least periodically drop the flow of natural gas or other fuel gas (e.g., to the burner's design minimum fuel flow) where the syn-gas may continue to be burned. The mass flow ratio range of fresh air 212 to burner air entering inlet 206 is generally ≥1, such as 1:1 to 3:1, being about 2:1 in one particular embodiment.

Figure 3B:
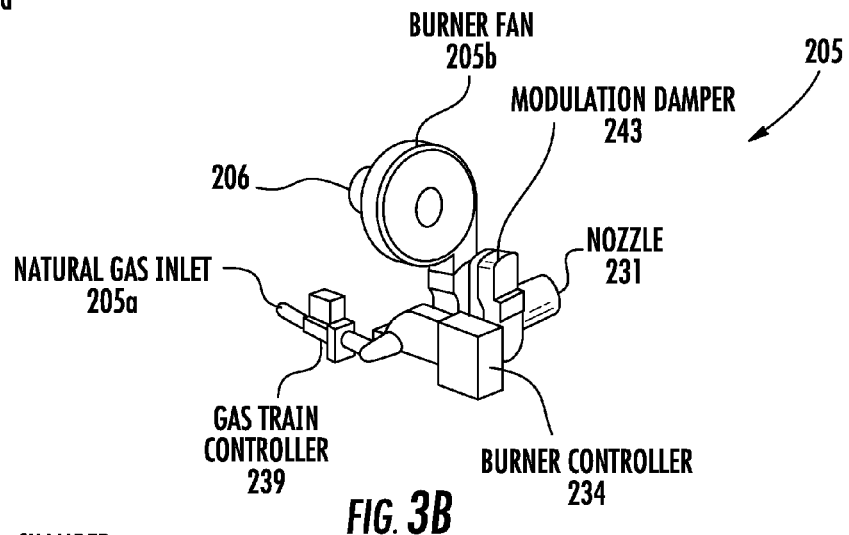
FIG. 3B shows example details for an example gas/fuel burner, according to an example embodiment.

FIG. 3B shows example details for an example gas/fuel burner 205. Gas fuel/burner 205 is shown including a fuel inlet shown as a natural gas inlet 205a, a burner fan 205b, a gas train controller 239, a modulation damper 243, and a burner controller 234 that may comprise in one embodiment a proportional-integral-derivative (PID) controller. Although gas fuel/burner 205 is shown having a natural gas inlet 205a receiving natural gas, as described above any combustible gas or combustible gas mixture may generally be used to generate the flame 227.

Figure 3C:
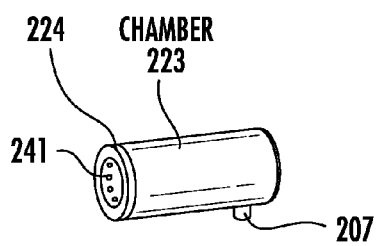
Figure 3D:
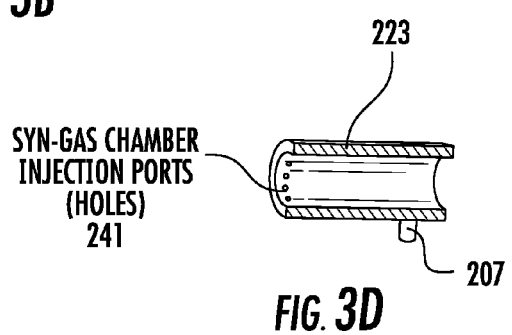
FIG. 3D shows a cut-view of the example syn-gas chamber shown in FIG. 3C.

FIG. 3C shows an example syn-gas chamber 223 showing a syn-gas nozzle plate 224 with nearby injection holes 241 for injecting the syn-gas into the flame 227. FIG. 3D shows a cut-view of the example syn-gas chamber 223 shown in FIG. 3C.

As shown in FIG. 3A, the flame 227 generated within the syn-gas chamber 223 extends into the second end 209$_2$ of the burner chamber 209 through the aperture 209$b_1$ in the burner chamber inlet plate 209b. The flame 227 including the burned natural gas and syn-gas together thus generate heat carried by fresh air 212 provided by fan 213 through the burner chamber 209 to provide radiant heat 215 to process equipment shown as the reactor chamber 120 in FIG. 2A. The radiant heat 215 may be used in one embodiment as a heat source to provide additional heating to aid in pyrolizing a bio-mass material (e.g., tire crumb). The burner chamber 209 burns a pyrolytic gas (typically mostly methane) and the gas/fuel burner 205 burns natural gas or other combustible gas which is reflected in the type of burner gas/fuel burner 205 provided to generate the flame 227.

The gas/fuel burner 205 has a control mechanism shown in FIG. 3B as a gas train controller 239 for regulating the gas pressure and flow of the combustible gas shown as natural gas. A gas train controller 239 is standard equipment with most commercially available burners. The syn-gas chamber 223 is the region where the burner nozzle 231 protrudes and the flame 227 starts. This syn-gas chamber 223 is the area where the syn-gas is distributed into the flame 227 via the injection holes 241 near the syn-gas nozzle plate 224 as shown in FIG. 3A.

The use of a modulating burner for gas/fuel burner 205 can also help control the amount of heat generated in the burner chamber 209. "Modulating" used herein in a "modulating burner" refers to the feed air shown as burner air entering inlet 206 provided to the flame 227 of gas/fuel burner 205 being controlled to be non-constant, such as by a PID controller which opens a modulation damper 243 shown in FIG. 3B that is operable to change the flow of burner air entering inlet 206 into gas/fuel burner 205 according to the need reflected in a given temperature set point in the burner chamber 209 sensed by the temperature sensor 210.

Conventional burners cannot burn two different gas sources. Burners that accept two different gas sources generally require a constant volume and energy (e.g., British thermal unit (BTU)) value of the gases. The syn-gas chamber 223 shown prevents problems associate with burning different gases. A pyrolytic gas is pushed into the syn-gas chamber 223 via syn-gas feed line 207 and passes through the injection holes 241 near the syn-gas nozzle plate 224 (see FIG. 3C) into the flame 227. The syn-gas is ignited by the burner flame 227 from gas/fuel burner 205. Heat is generated for this ingestion. The burner chamber's 209 length is generally sufficiently long so as to provide no less than 3 seconds for exposure time, and a longer time if the air flow is relatively low, to provide a heat treatment sufficient to generally destroy essentially all contaminates in the pyrolytic gas. A flame arrestor 208 shown on FIG. 2A prevents back feed to the syn-gas feed line 207.

As described above and shown in FIGS. 2A and 2B, the heat box 201 including top portion 201a and bottom portion 201b is around the reactor chamber 120 and burner chamber 209. The heat box 201 can comprise a variety of different metal or metal alloys. The board insulation 202 within heat box 201 helps prevent heat transfer to the skin of the heat box 201. The higher the process heat needed, the thicker the board insulation 202 generally should be. About 1 inch per 1000° F. (=555° C.) generally keeps the skin of the heat box 201 at a temperature below 120° F. An optional opening(s) to the reactor chamber 120 can be designed into the heat box 201 by way of split bolted connections. These opening(s) can be designed in almost any location. The limitation to adding these optional openings/port penetrations is generally only the overall expansion of the reactor chamber 120.

The heat box 201 acts like a convection oven, as it uses air flow to more evenly heat the reaction chamber 120 throughout. The heat box 201 and the reactor chamber 120 along with the burner chamber 209, all generally expand at different rates. The expansion seals shown as 203 (upper) and 216 (lower) in FIG. 2A allow for movement of the penetrations while keeping the heat and air inside. The heat box 201 can be supported from the reactor chamber 120 or externally supported to allow the reactor chamber 120 to expand as needed.

Safety devices and construction are provided with disclosed gas processors 200 for added safety for use. The use of heavy wall materials for the burner chamber 209 can withstand an explosion in the event of built-up gas under a flame out occurring. The burner chamber 209 is also vented by the burner flue pipe 211 to the atmosphere. Temperature sensors are used to measure both in the reactor chamber 120 (temperature sensor 220) which can be used to control reaction temperature and in the burner chamber 209 temperature (temperature sensor 210) which can be used to control the temperature of the burner chamber 209. A high quality burner is generally used for burner chamber 209 which is generally equipped with flame sensors and with air balance control. The burner chamber 209 can also be cooled besides by fresh air pipe 214 to help prevent overheating. The burner chamber 209 material is generally a high quality metal alloy that is designed for high temperatures. Slip clamp connections are generally designed to allow for material expansions.

Figure 3E:
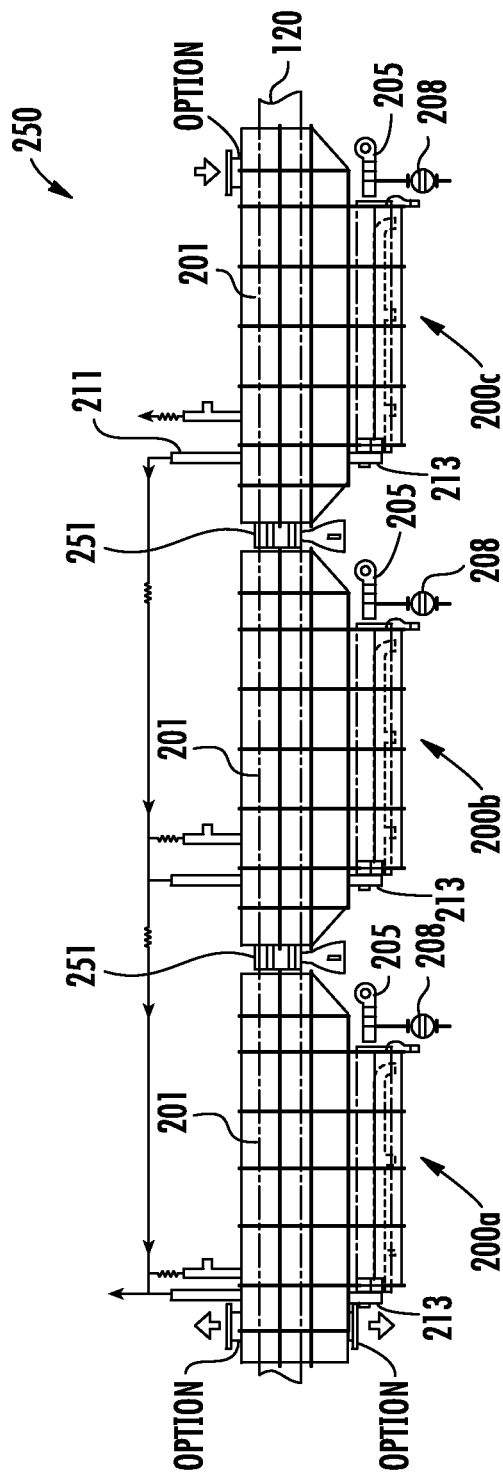
FIG. 3E shows a disclosed gas processor in a modular design including a plurality of gas processor modules that allows for a combination of design arrangements, according to an example embodiment.

FIG. 3E shows a disclosed gas processor 250 in a modular design including a plurality of gas processor modules (gas modules) that allows for a combination of different design arrangements. The port penetrations, bolted assembly and ability for off-site fabrication make this modular design easy and fast to install. The coupling structures 251 shown between the gas modules 200a, 200b and 200c can in one embodiment comprise a split band clamp with a gap (e.g., about a ⅛" gap) to allow movement. The gas modules 200a, 200b and 200c can be combined in any number or length to provide radiant heat for a given process for any total length reactor chamber, such as reaction chamber 120 for tire conversion system 100. Each module 200a, 200b, 200c can be controlled to provide different temperatures if needed and to allow for different expansion rates. The burner flue pipes 211 for each module 200a, 200b, 200c can be combined into one common vent location. Expansion in the flue duct can be achieved via a flex pipe.

Figure 4:
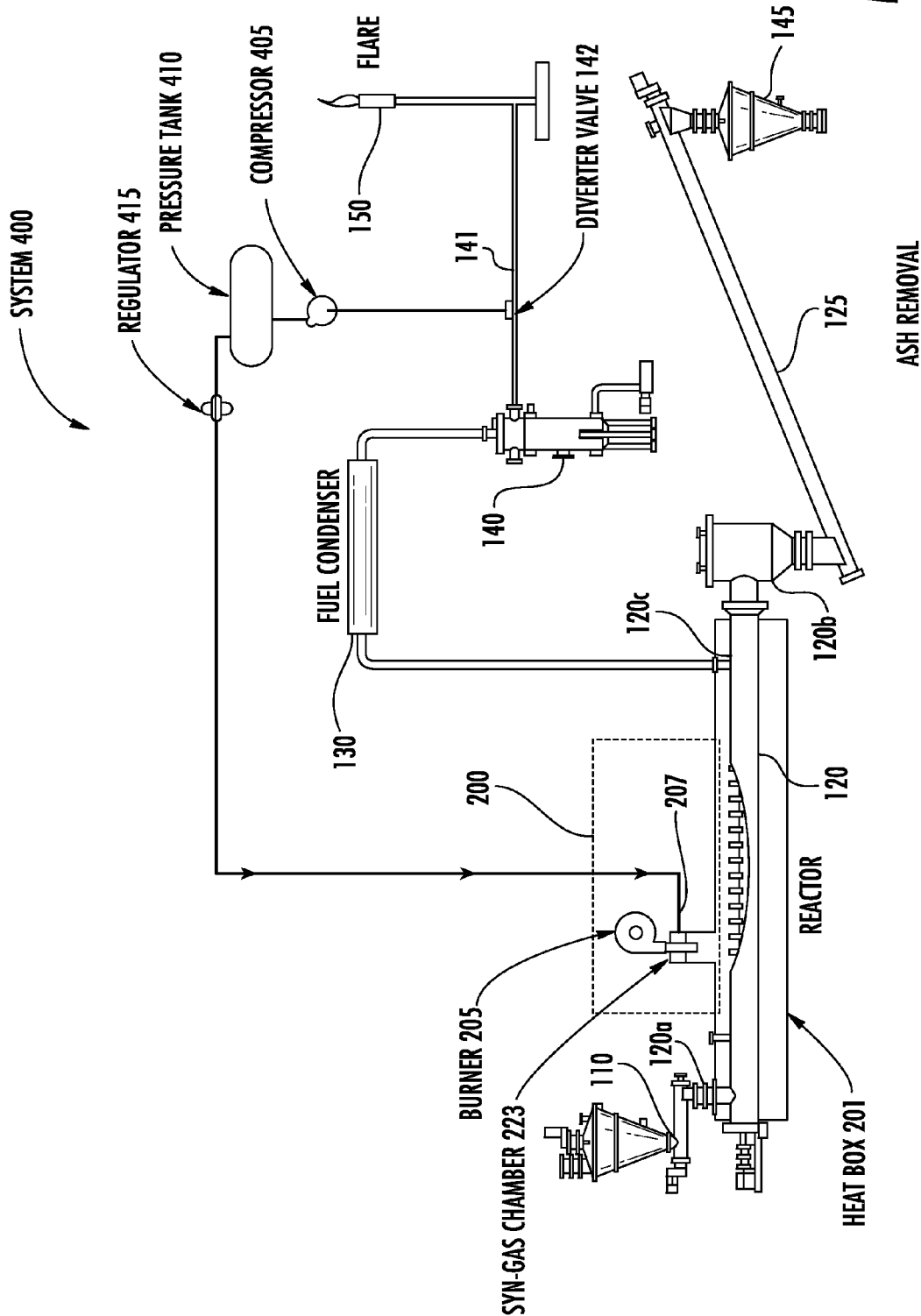
FIG. 4 shows an example pyrolytic tire conversion system (system) including the gas processor shown in FIG. 2A that provides heat to the reactor chamber of the system, according to an example embodiment.

As described above, although the conventional tire conversion system 100 generally flares the syn-gas using a flaring apparatus 150, disclosed gas processors recognize instead of flaring the syn-gas and thus "wasting" it, the syn-gas can be utilized for heating a process. FIG. 4 shows an example pyrolytic tire conversion system (system) 400 including the gas processor 200 shown in FIG. 2A that is configured to provide heat to the reactor chamber 120, according to an example embodiment. System 400 includes the components shown in FIG. 1 along with a compressor 405 for pumping syn-gas generated in the reactor chamber 120 after some cooling by the heat exchanger/condenser 130 into a syn-gas pressure storage tank shown as a pressure tank 410. As shown, a tap in the pipe 141 that feeds the flaring apparatus 150 has a diverter valve 142 which diverts the syn-gas flow to the compressor 405 instead of to the flaring apparatus 150. A pressure regulator 415 allows a regulated feed of syn-gas from the pressurized tank 410 to feed the syn-gas chamber 223 of the gas processor 200 via the syn-gas feed line 207.

Regarding construction information, the heat box 201 generally comprises a metal or metal alloy construction such as stainless steel is used in the event of a loss of the board insulation 202. A welded flat bar (of matching material) can be attached for both the bolted seams and stiffeners to reduce the metal from warping. Insulation clips can be welded inside the box panels to hold the board insulation 202. If a relatively low process temperature is used (below 500° F.) by the reaction chamber 120, then carbon steel can be used and painted with a heat resisted paint. The board insulation 202 is positioned inside the heat box 201. The heat box 201 can be fabricated off site and shipped in flat sections.

The burner chamber 209 is generally constructed from a high heat alloy material that can withstand heating to over 2,000° F. In most cases 310 stainless steel can be used. The end plates are generally secured by a welded construction. The fresh air pipe 214 can also generally comprise 310 stainless steel, and a welded construction. The fresh air pipe ports 214b are generally welded to the burner chamber 209 to prevent any gas or fuel leak into the heat box 201. The heat fins 214a are also generally welded to the fresh air pipe 214 to improve heat transfer to the pipe skin. The heat fins 214a have holes in their surface (e.g., 20% to 60% open area, such as 40% open area in one particular embodiment) to allow for more heat to pass through the heat fins 214a, increasing the heat transfer rate. The problem of pipe expansion between the burner chamber 209 and the fresh air pipe 214 is solved by using the same materials of construction. This helps prevent thermal stress on the weld joints and help avoid weld cracks.

Another disclosed embodiment comprises a combination ash filter and re-boiler referred to herein as an "ash-filter/reboiler". The ash filter/re-boiler is generally described herein as being positioned between the flue pipe of a reactor chamber and the inlet to a fuel condenser in a tire recycling system, such as between the flue pipe 120c and heat exchanger 130 of tire conversion system 100 shown in FIG. 1. However, disclosed ash filter/re-boilers can be used for a variety of systems besides tire recycling systems, generally in systems having a heat/vapor reactor, distiller, or any bio-mass pyrolysis system.

For a typical tire recycling system, such as the tire conversion system 100 shown in FIG. 1, ash filtering and re-boiling are two separate processes. First, fuel in vapor form generated along with the entrained ash is collected from the flue pipe 120c of the reactor chamber 120 via a heat exchanger 130, which is then transferred to a collection tank 140 for ash filtering. Ash filtering may be through a centrifuge or a distillation process. Accordingly, for a typical tire recycling system separate collection tanks are provided for the fuel having a significant concentration of ash particles (dirty fuel) and for the fuel having a reduced concentration of ash particles (cleaned fuel). Also a transfer system for both dirty and clean fuels are needed. In the case of a centrifuge cleaning of ash particles from fuel, water is generally used to backwash the centrifuge cleaning unit and then it needs to clean. A distillation system requires tanks and transfer systems too, along with added energy to evaporate and collect.

Disclosed ash-filter/reboilers recognize there is an advantage utilizing the heat of the incoming fuel vapors and using the collected fuel as a filter (bubbler) to clean the ash particles from the fuel. Disclosed ash-filter/reboilers also provide a way to allow the incoming vapor heat to keep the re-boiled vapors hot (and thus moving).

Carbon ash is a byproduct of vaporized tire crumb. This ash (or char) is light (low density) and a significant portion will travel entrained in the vaporized fuel out that flows out the flue pipe 120c of the reactor chamber 120. This ash is partly carbon black and stains the fuel to a jet black color, where the true color of the pure fuel in contrast is light gold. This ash is considered a contaminant in some fuel specifications.

As a result, removal of the ash particles from the fuel increases the value of the fuel. The reactor chamber 120 discharges the fuel vapors including entrained ash particles out the flue pipe 120c at about the same temperature as the reactor chamber 120. It is recognized to cool the fuel vapors down to a liquid stat then reboil them back to a vapor temperature is generally a "waste" of energy. A design that uses the heat of the fuel vapors from the reactor chamber 120 is recognized to be able to improve system efficiency, such as the efficiency of the tire conversion system 100. This embodiment uses radiant heat from the fuel vapors to expand the reboiled fuel vapors to help push the fuel material up a column and allow the ash particles to be saturated with liquid fuel, thus separating the ash particles from the fuel.

Figure 5A:
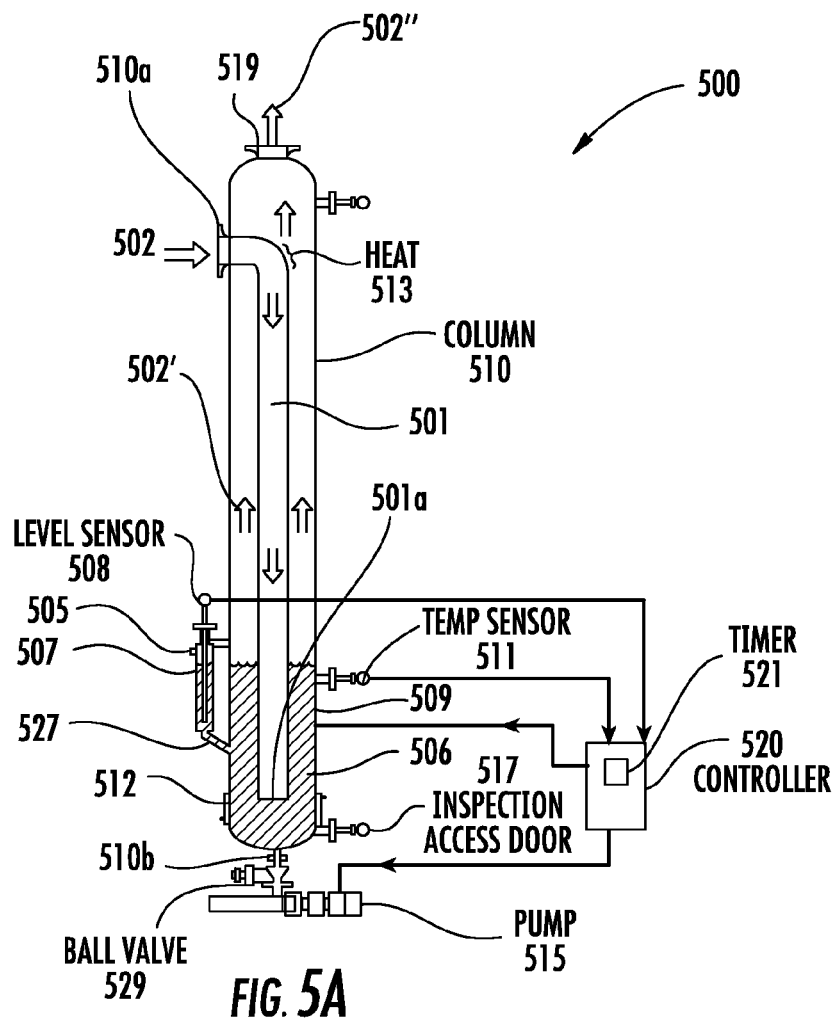
FIG. 5A is a depiction of an example ash filter/reboiler, according to an example embodiment.

FIG. 5A is a depiction of an example ash-filter/reboiler 500 including an outer column (column) 510 having a vapor inlet tube 501 therein. Ash laden fuel vapors are pulled from a source of ash laden fuel vapors 502, such as from the flue pipe 120c of the reactor chamber 120 shown in FIG. 1 into the vapor inlet tube 501 coupled to the inlet 510a of the column 510 where once received the ash laden fuel vapors 502 travel down the vapor inlet tube 501 which during their travel transfers heat from the inside of vapor inlet tube 501 to provide radiant heat 513 from the outside of the vapor inlet tube 501. The vapor inlet tube 501 is formed from a thermally conductive material defined herein as having a bulk thermal conductivity of ≥100 W/m·K, such as comprising a metal or metal alloy, being thin wall 310 stainless steel in one particular embodiment. Vapor inlet tube 501 thus functions as an inlet tube heat exchanger.

The ash laden fuel vapors 502 then emerge from an opening 501a at the bottom of the vapor inlet tube 501 and upon emerging from the opening 501a come in contact with cooled liquid fuel 506 that is cooled by a cooler shown as a water jacket 512 shown at the bottom portion of the column 510 which condenses the ash laden fuel vapors 502 into the liquid fuel 506 shown which may partially be in the form of vapor bubbles. Other coolers can be used besides a water jacket. As described in detail below, after ash particle removal processing of the liquid fuel 506, the liquid fuel 506 is heated by an electric heater band (heater band) 509 to form cleaned fuel vapors 502' which is provided as cleaned fuel vapor 502" that flows out from the vapor outlet 519 at the top of the column 510.

Figure 5B:
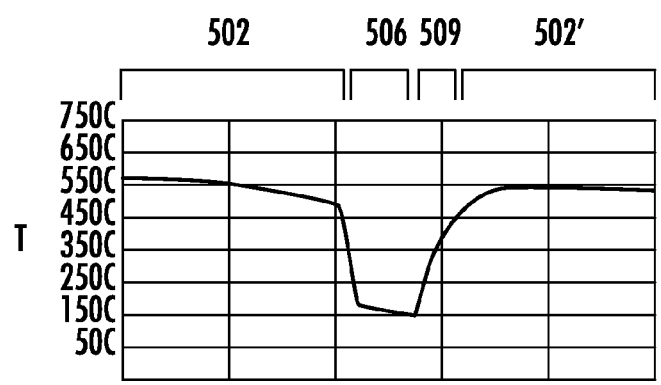
FIG. 5B shows an example temperature profile for an example ash filter/reboiler as a function of position along the path from input to output for the ash laden fuel vapors, cooled liquid fuel, heater band and cleaned fuel vapor, according to example embodiments.

FIG. 5B shows an example temperature profile for an ash filter/reboiler as a function of position along the path from input to output for the ash laden fuel vapors 502, cooled liquid fuel 506, heater band 509 and cleaned fuel vapor 502'. As shown, the cooled liquid fuel 506 is up to about 400° C. cooler as compared to the temperature of the ash laden fuel vapors 502 and cleaned fuel vapors 502'. As the ash laden fuel vapors 502 upon cooling turn into liquid fuel 506, the liquid fuel 506 soaks into the ash particles and as a result the ash particles become heavier (denser) than the liquid fuel 506.

The heavier ash particles will drop towards the bottom of the liquid fuel 506 in the column 510 allowing pumping liquid fuel with concentrated ash particles out from the outlet 510b in a bottom of the column 510 by a pump such as the discharge pump 515 shown, for example back to the reactor chamber 120 through the same inlet 120a which receives the tire crumb from feed mechanism 110. For example, applied to the tire conversion system 100 shown in FIG. 1, the pumping can be triggered by an elapsed time tracked by a timer 521 within the controller 520 that is shown coupled to an input of the discharge pump 515. Time-based control when implemented is generally used along with level control which utilizes level information of the liquid fuel 506 provided by level sensor 508 as described below. When the liquid level is increased beyond a predetermined high level, the discharge pump 515 will run to prevent over filling. The timer 521 is used if the predetermined high level to trigger operation of the discharge pump 515 is not reached after a predetermined period of time, so that ash collected in the fuel at the bottom of the column will still be removed via discharge pump 515.

Figure 6A:
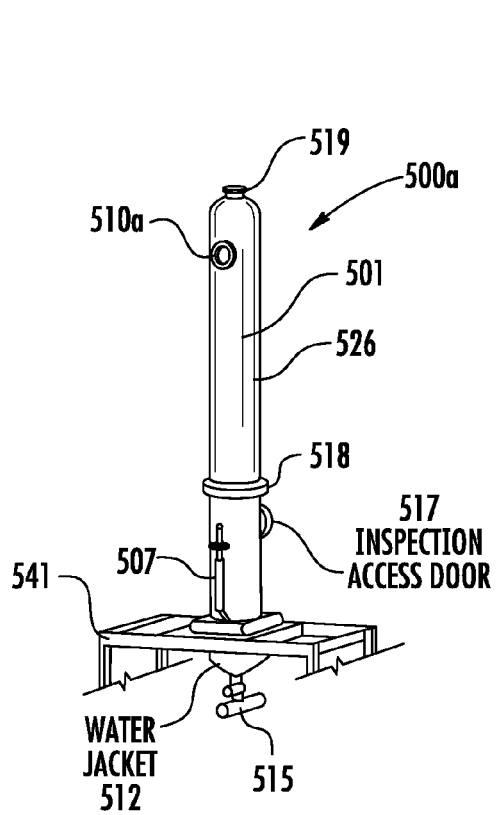
FIGS. 6A, B and C shows the assembled, stack-up and cut-away views of an example ash filter/reboiler, according to an example embodiment.

The column 510 can be designed to be attached to an expanding reactor, such as to the reactor chamber 120 of the tire conversion system 100 shown in FIG. 1, with its vapor inlet tube 501 coupled to receive fuel vapors with entrained ash particles from the flue pipe 120c of the reactor chamber 120. In this design, the ash-filter/reboiler 500 can be mounted on a rolling cart, such as depicted in FIG. 6A described below.

The discharge pump 515 is generally attached to a flex hose to allow for movement. A liquid fuel outlet is shown as a ball valve 529. The upper section of the column 510 is shown as 526 in FIGS. 6A-C, and vapor inlet tube 501 can be welded to a spinable flange shown in FIG. 6A via a stub end flange connection 518. This allows alignment of the location of the vapor inlet tube 501.

A side chamber 507 is attached on the side of the column 510 outside the heater band 509 that has a fluid connector portion 527 for providing liquid fuel 506 into the side chamber. The temperature of the liquid fuel 506 in the side chamber 507 is generally cooler than the temperature of the liquid fuel 506 in the column 510, with the liquid fuel 506 in the side chamber 507 shown cooled by a gas cooling port 505 that is coupled to receive a gas flow (from a gas source that is not shown) for cooling such as $N_2$, which by directing a cooling gas at the walls of the side chamber 507 can lower the temperature of the liquid fuel in side chamber 507 relative to the liquid fuel 506 in the column 510. The temperature of the liquid fuel 506 in the side chamber 507 relative to the liquid fuel 506 in the column 510 is generally lower by 5% to 30% expressed in ° C.

A level sensor 508 is shown on the top of the side chamber 507. The level sensor 508 is operable for proving an essentially continuous level measurement to the controller 520 that permits maintaining the liquid level inside the column 510 in a predetermined level range and maintaining a continuous level without seeing high heat of the liquid fuel 506 that may be about 200° C. to 250° C. The level measurement can be used to trigger the controller 520 to send a control signal for turning ON of the discharge pump 515 to maintain a level for the liquid fuel 506 over the heater band 509 so the liquid fuel 506 boils and does not excessively heat on the side.

Ash-filter/reboiler 500 is also shown comprising at least one temperature sensor including temperature sensor 511. A set of thermo couplings (not shown) can be slipped between the heater band 509 and the column 510 to maintain control of the temperature of the liquid fuel 506. The thermo couplings function to tell the controller 520 such as a Solid State Relay (SSR) controller the temperature which is used to stop or start the heater band 509 as needed to reach the set point temperature. Two thermo couplings may be used with one used as a back-up. Such temperature control can avoid excessive temperatures which can reduce the amount of ash particle laden fuel being re-vaporized into the cleaned fuel vapor 502' that moves up the column 510 as shown in FIG. 5A.

In operation, the pumping cycle executed by ash-filter/reboiler 500 will remove most of the collected ash particles from the incoming ash laden fuel vapors 502 and as described above can return the liquid fuel with concentrated ash particles to the inlet 120a of the reactor chamber 120 of the tire conversion system 100 shown in FIG. 1 for drying. As the collected vapors turn into liquid and make a level point, heat is added via a heater band 509 sufficient to vaporize the fuel again to provide cleaned fuel vapors 502'. This cleaned fuel vapor 502' travels up the column 510 and continues to pick up heat shown as radiant heat 513 from the vapor inlet tube 501. This heat 513 helps to expand the vapors and increase the travel velocity up the vapor inlet tube 501. The cleaned fuel vapors 502' will then be discharged from the vapor outlet 519 at the top of the column 510 into a condenser such as shown in FIG. 1 as fuel condenser 130 and back into cleaned fuel that can be deposited in a separate clean fuel collection tank.

Figure 6B:
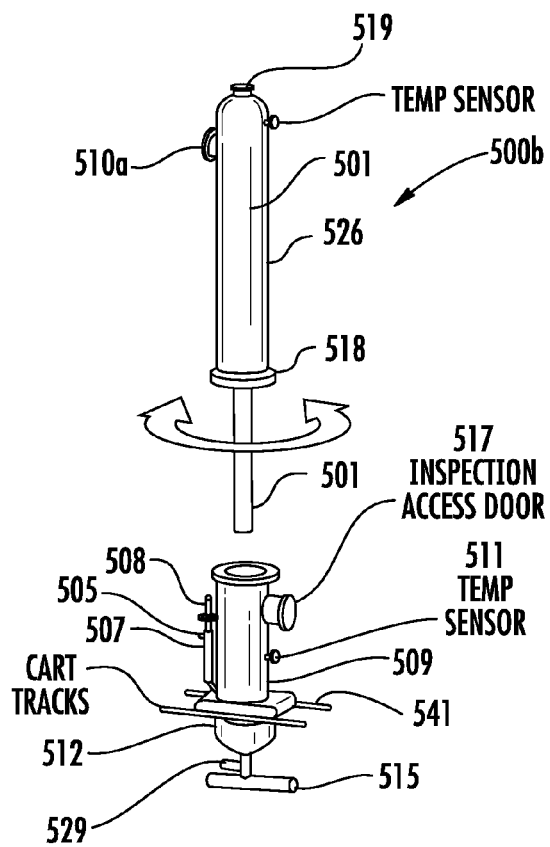
Figure 6C:
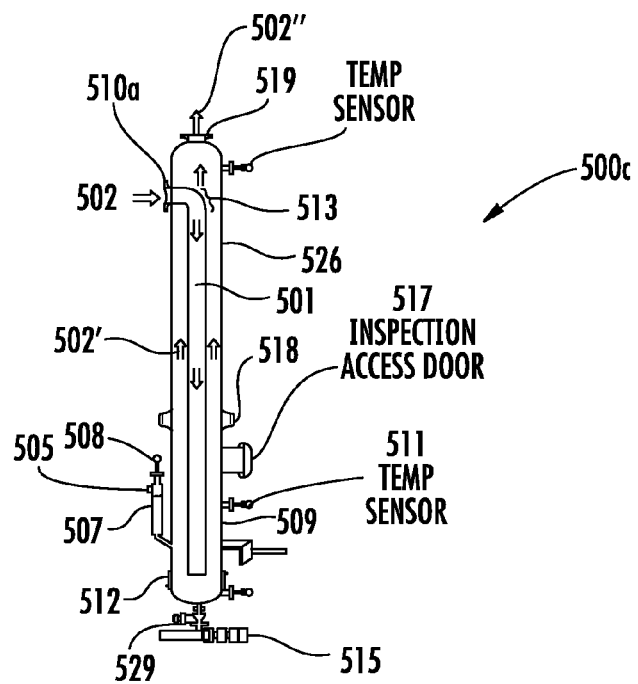

FIGS. 6A, 6B and 6C shows assembled, stack-up and cutaway depictions of the ash-filter/reboiler 500 shown in FIG.

5A and its attachments, as 500*a*, 500*b* and 500*c*, respectively. Ash filter/reboiler 500 is shown in FIG. 6A mounted on a rolling cart 541. A stub end flange connection is shown as 518. Upper housing portion is shown as 526. The inspection access door is shown as 517.

Various sub-systems are now disclosed that can be used individually or together in any combination in a commercialized industrial vacuum pyrolysis system, such as the tire conversion system 100 shown in FIG. 1 described above, to convert processed tire crumb into pyrolytic oil, carbonaceous carbon char and synthetic gases. Such embodiments recognize known vacuum pyrolytic tire conversion systems have multiple limitations that prevent the production of high quality end products and by-products with high throughput and output ratios. Disclosed sub-systems enable the overall system to be dimensionally smaller and provide a more rapid total process with far greater consistency and quality output of pyrolytic liquid oils, carbonaceous carbon char material and synthetic gases that are utilized within the system to provide both heat and energy.

Figure 7A:
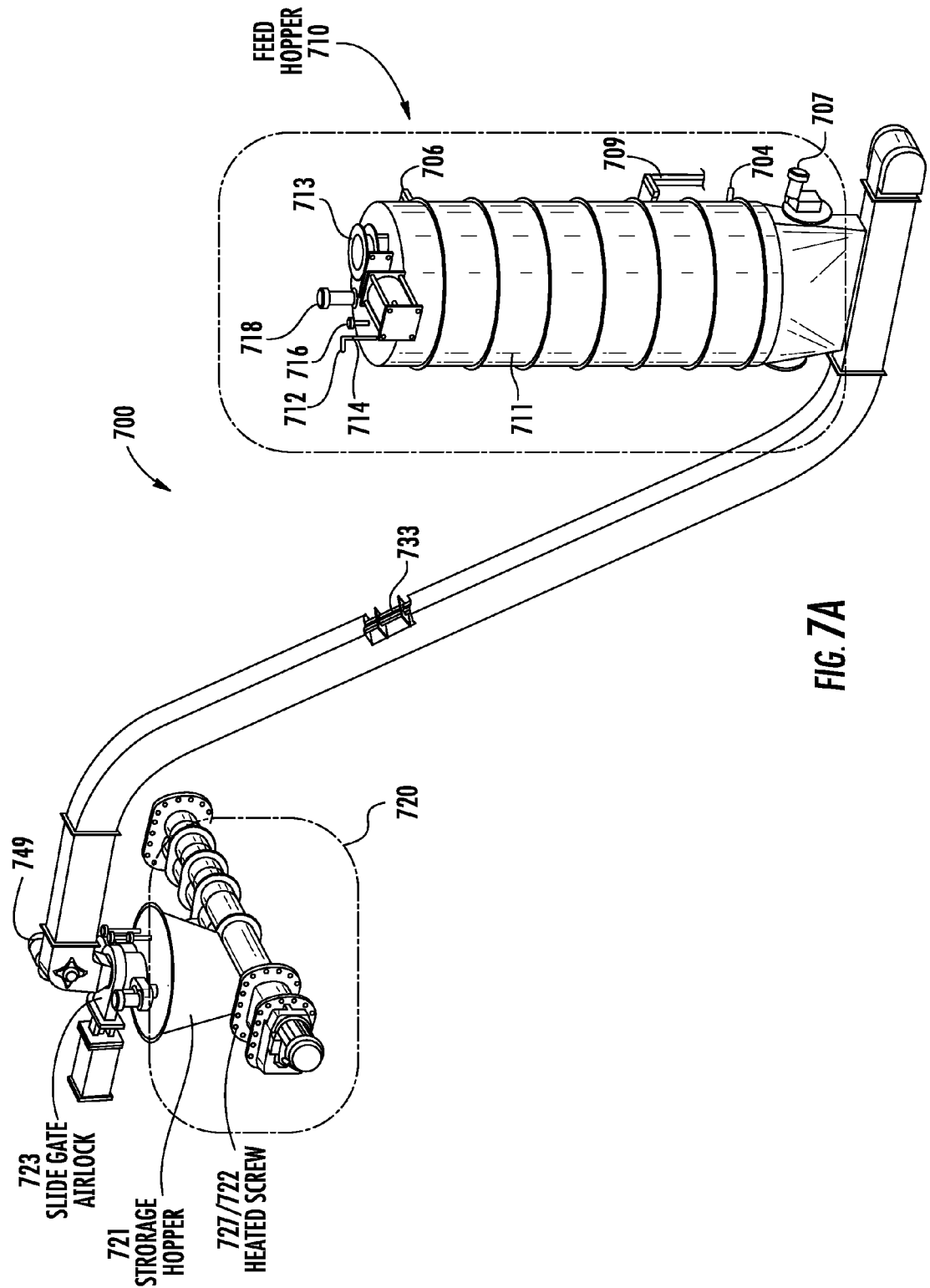
FIG. 7A is a schematic view showing an example of a semi-continuous batch feeder system with a double gated airlock.

FIG. 7A is a schematic view showing an example of a semi-continuous batch feeder system (batch feeder system) 700 having a double-gated airlock, according to an example embodiment. Conventional batch feeder systems have only a single airlock. Batch feeder system 700 includes a batch feed hopper 710 that includes a slide gate airlock 713 that when open allows entry of tire crumb along with air from a tire crumb supply conveyer (see slide conveyer 747 shown in FIG. 7D described below), which operates semi-continuously that is coupled by an enclosed drag conveyer 733 to a force feed auger 720 having another slide gate airlock 723 that feeds tire crumb into the storage hopper 721. Force feed auger 720 couples tire crumb to an inlet of a reactor chamber (such as inlet 120*a* of the reactor chamber 120 shown in FIG. 1) through an opening in the bushing retainer collar 724 shown that functions as a flange. Vacuum displacement in the slide gate airlock 713 for the feed hopper 710 and slide gate airlock 723 for the force feed auger 720 prevents oxygen from entering the reactor chamber through the opening in the bushing retainer collar 724. Although not shown in FIG. 7A, there is at least one vacuum pump that provides the vacuum within the batch feeder system 700 with pumping through vacuum control valve 714 (for batch feed hopper 710) and 731 for force feed auger 720 (shown in FIG. 7D).

The feed hopper 710 includes a material holding tank 711 that is maintained under vacuum by a vacuum pump that pumps through the vacuum control valve 714 shown along a line that includes pressure sensor 712. A level sensor 716 is shown at the top of the material holding tank 711. A VFD 718 and nitrogen control valve 719 (see FIG. 7D described below) coupled to a nitrogen source (not shown) are also at the top of the material holding tank 711. The VFD 718 operates a bridge breaking auger (auger) 717*a* shown in FIG. 7D described below which keeps the tire crumb material from bridging in the material holding tank 711. A high level sensor 706 is also shown coupled to the material holding tank 711. Towards the bottom of the material holding tank 711 there is a level sensor 704 and a VFD 707 which operates an auger 717*b* shown in FIG. 7D described below. Support metal (e.g., steel) 709 secures the feed hopper 710 to the floor and to above the enclosed drag conveyer 733.

Figure 7D:
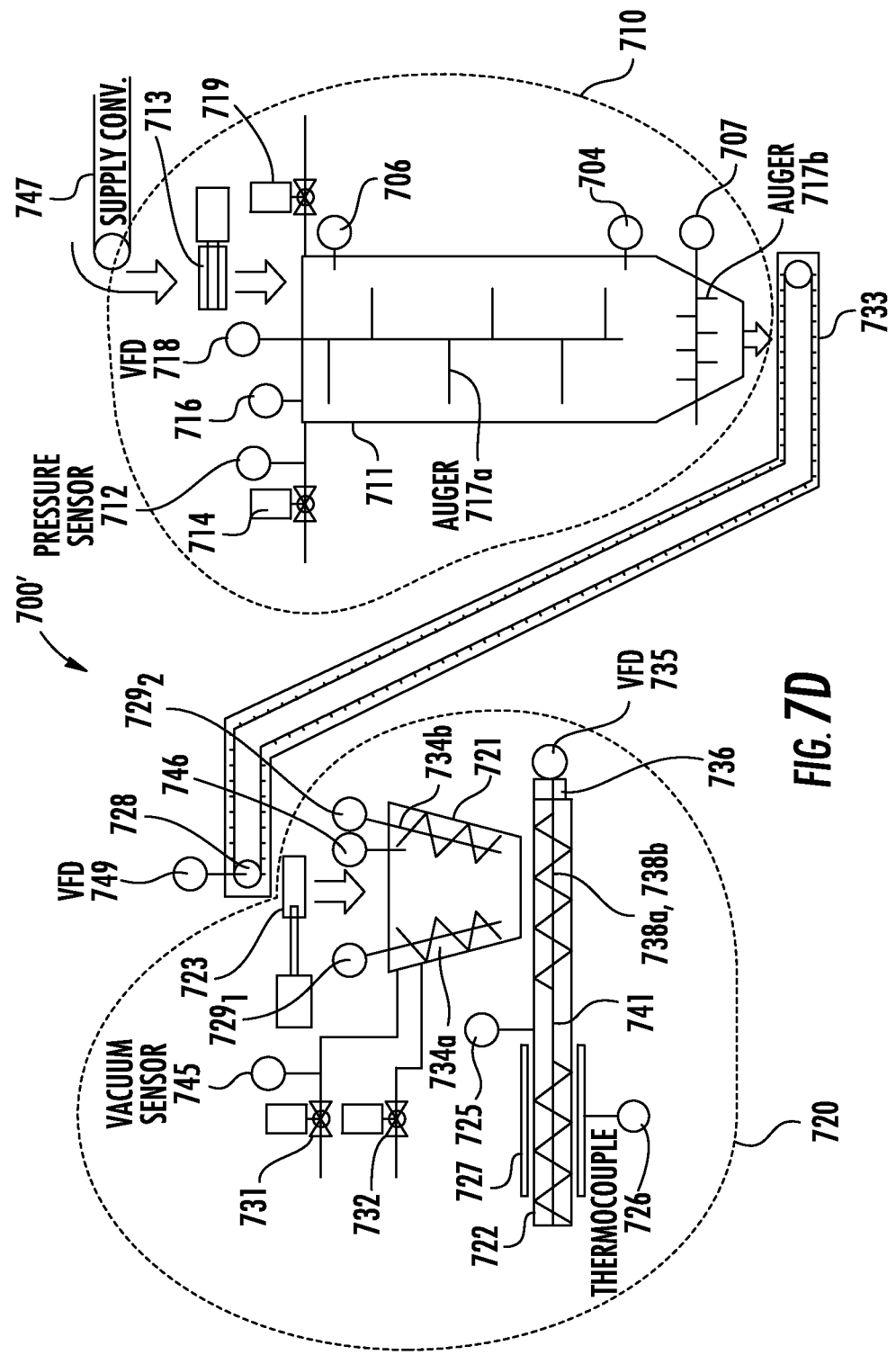
FIG. 7D is a depiction of a semi-continuous batch feeder system having a double-gated airlock, according to an example embodiment, used to explain tire crumb loading and transferring operations for one storage tank cycle performed by disclosed batch feeder systems.

Force feed auger 720 in FIG. 7A is shown receiving tire crumb from the enclosed drag conveyor 733 and includes a VFD 749 operating an auger 728 shown in FIG. 7D for moving tire crumb into the storage hopper 721 when slide gate airlock 723 is open. Force feed auger 720 is also shown including a heater band 727 that heats a twin extrude screw 722 shown as heated screw 727/722 in FIG. 7A.

FIG. 7B shows further details for an example force feed auger 720. Heater 727 is shown comprising electric heater bands and the twin extrude screw 722 is shown having the screw flights 738*a* and 738*b* better shown in FIGS. 7C and 7D. On the top of the storage hopper 721 there is shown a first VFD 729$_1$ and a second VFD 729$_2$ which operate force augers 734*a* and 734*b*, respectively. A vacuum control valve 731 is shown that provides an isolated control generally used only as a backup to maintain vacuum pressure within the force feed auger 720. Nitrogen control valve 732 and level sensor 746 are also shown.

Another VFD 735 is shown that is coupled to a power gear box 736 that drives the screws flights 738*a* and 738*b* shown in FIG. 7C. The screw flights 738*a* and 738*b* function as a force-feed ram which compresses the tire crumb feed material to ensure a feed rate into the reactor chamber and prevent material bridging. A pressure sensor 725 and thermocouple 726 (see FIG. 7D) are shown coupled to the twin extrude screw 722 for sensing pressure and temperature therein. Bushing retainer collar 724 is also shown.

FIG. 7C is an exploded view that shows further details for the example force feed auger 720 including left screw flight 738*a* and right screw flight 738*b* which are driven by VFD 735 via gear drive assemblies 739*a* and 739*b*. The left screw flight 738*a* and right screw flight 738*b* each include a gap 741 that create a pressure zone by accumulating a plug of tire crumb therein during operation of force feed auger 720. The left screw flight 738*a* and right screw flight 738*b* are shown coupled to the bushing retaining collar 724 by shaft bushings 742.

FIG. 7D is a depiction of a semi-continuous batch feeder system shown as 700' having a double-gated airlock, according to an example embodiment, used to explain tire crumb loading and transferring operations for one storage tank cycle performed by disclosed batch feeder systems. A vacuum sensor 745 is shown coupled to storage hopper 721. VFD 718 is shown coupled to drive an auger 717*a* that extends within the material holding tank 711. When the vacuum control valve 714 is open, nitrogen control valve 719 is closed, slide gate airlock 713 is closed, slide gate airlock 723 is opened, and enclosed drag conveyer 733 is running on demand determined by the material level in storage hopper 721 sensed by the level sensor 746. Twin extrude screw 722 is running along with force augers 734*a* and 734*b*, and the heater band 727 is controlled by the temperature sensed by the thermocouple 726.

The nitrogen control valve 732 that is coupled to a nitrogen source (not shown) is closed and is generally only used for shut down. The vacuum control valve 731 is open. VFD 718 and VFD 707 are running. In the tire crumb re-fill cycle, the level sensor 704 indicates a low material level in the material holding tank 711. Enclosed drag conveyer 733 stops. The slide gate airlock 723 closes. The vacuum control valve 714 closes then the slide gate airlock 713 opens. The supply conveyer runs until the high level sensor 706 or back-up high level sensor 716 back-up indicates material is present. The supply conveyor 747 stops. The slide gate airlock 713 is closed then vacuum control valve 714 opens. When the vacuum meets set point as indicated on pressure sensor 712, then slide gate airlock 723 opens and enclosed drag conveyor 733 starts. When the high level sensor 706 indicates a low material level, the above-described cycle starts over again.

Figure 8A:
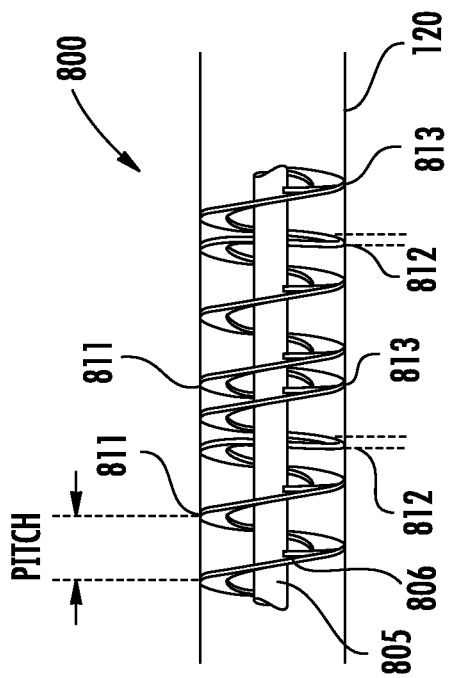
FIG. 8A is a schematic view showing an example pulse rotary conveyer with paddle flights.

FIG. 8A is a schematic view showing an example pulse rotary conveyer (pulse rotary conveyer) 800 having a plurality of conveyer flights 811, 813 (conveyer flights) configured to together form a helical-shaped screw, according to an example embodiment. Pulse rotary conveyer 800 is sized to be positioned within the reactor chamber 120, to receive tire crumb from an inlet of the reactor chamber 120, and to be driven by a VFD positioned just outside the reactor chamber 120 that is coupled to the main drive shaft (drive shaft) 805 of the pulse rotary conveyer 800. Drive provided by the VFD sets a rotation rate (e.g., rotation per minute (RPM)) of the pulse rotary conveyer 800 which results in the tire crumb received being pushed in a pulsed fashion with periodic pauses in movement of the tire crumb towards the outlet side (from left to right as shown in FIGS. 8B-8E) of the reactor chamber 120. As described below, the design of the conveyer flights provides pause times for movement of the tire crumb even when a constant RPM is used. The VFD allows changing the volume rate of the tire crumb, the faster the rate the more tire crumb throughput is provided.

The drive shaft 805 of the pulse rotary conveyer 800 has outwardly projecting ribbon spokes 806 that secure the plurality of conveyer flights including different flight configurations to the drive shaft 805, where the conveyer flights are secured to the ribbon spokes 806 generally by welds. Conveyer flights are generally paddle shaped having a center aperture sufficient to fit over the diameter of the drive shaft 805. The conveyer flight's diameters are somewhat smaller as compared to the diameter of the reactor chamber 120 so that they extend from above the bottom wall of the reaction chamber 120 to below the top wall of the reaction chamber 120, with the center line of the drive shaft 805 being below the center line of the reactor chamber 120. This enable vapors to travel unrestricted across the reactor chamber 120 due to the open space above the conveyer flights.

A half pitch length is shown as a "pitch" in FIG. 8A. The leftmost conveyer flight 811 is a flight that between its neighboring flights spans about one pitch in length. Assume a 10" pitch flight in FIG. 8A. Moving counter clockwise the first conveyer flight 811 starts at 3:00 o'clock and spirals 360 degrees 2.25 times ending at 12:00 o'clock. Flight 813 starts 5" into flight 813 at 6:00 and spirals 360 degrees 1.25 times ending at 3:00 o'clock. Now conveyer flight 811 starts 5" back from the end of 811 at 3:00 o'clock and the whole process repeats. As used herein, a "pitch length" refers to the distance between the ribbons 806 horizontally.

Feature 812 shows a pause area where the tire crumb material shown as 814 in FIGS. 8B-8E stops traveling for a brief period of time and melts. The rightmost conveyer flight 811 and conveyer flight 813 has a gap between them of 180 degrees. The tire crumb material 814 is not being pushed until the overlapping ribbon rotates 180 degree and starts to push the tire crumb material again. Conveyer flight 813 is an overlapping flight (singe pitch). Overlapping refers to the paused area between the overlapping flights. When one section of flight ends, the material is no longer pushed so it's liquids drains to the bottom of the rector chamber 120 and hits the hot reactor turning into vapor. Meanwhile the pulse rotary conveyer 800 is still rotating and the overlapping flight reaches the tire crumb material behind it and starts to push the tire crumb material again.

Figure 8B:
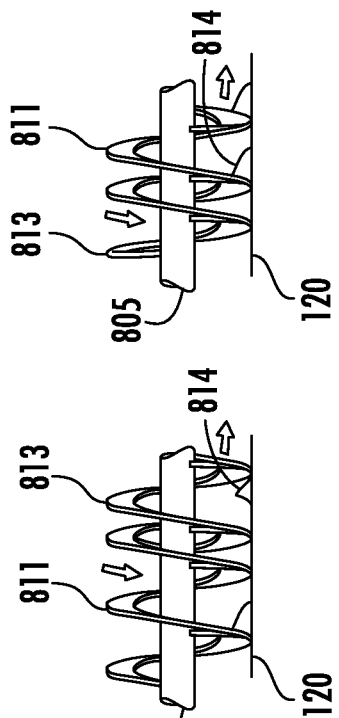
FIGS. 8B-E show the pulse rotary conveyer during various stages of operation during one movement cycle, according example embodiments.
Figure 8C:
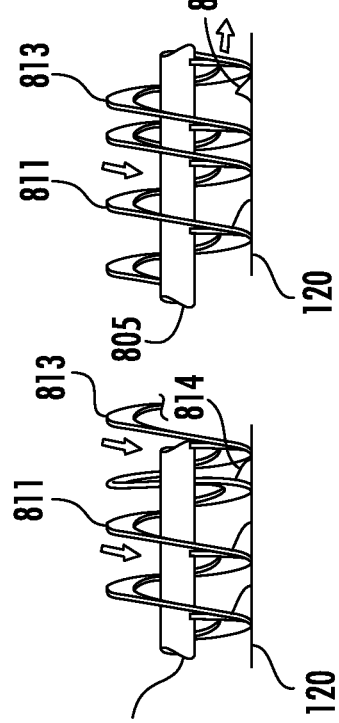
Figure 8D:
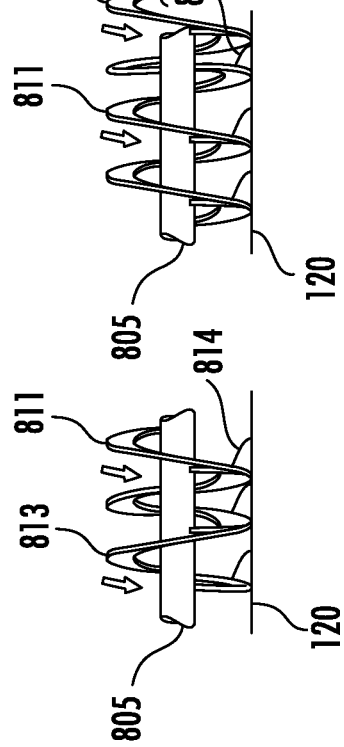
Figure 8E:

Tire crumb material 814 pushed by the conveyor flights is shown in FIGS. 8B-8E which depicts one cycle of operation for the pulse rotary conveyer 800. FIG. 8B shows the tire crumb material 814 moving to the right as the conveyer flight 813 rotates as shown. FIG. 8C shows the tire crumb material 814 stopped due to the end of the conveyer flight 811. FIG. 8D shows the conveyer flight 813 rotating around behind the tire crumb material 814. FIG. 8E shows the tire crumb material 814 moving again where it will move until it reaches the end of the conveyer flight 811. The process will start over again with the next set of conveyer flight 813 and 811 reaching the tire crumb material 814 so that the process is repeated through the length of the pulse rotary conveyer 800.

The length of travel of the tire crumb is based on the pitch of the conveyer flights and the RPM. The pause time is determined by the spacing distance between flights (FIG. 8A only shows the same pitch per flight). The ribbons 806 can be fabricated tighter changing the space "pitch" between the conveyer flights. This would make the tire crumb material 814 move slower at the same RPM. This pitch change is based on the desired rate and RPM.

As an option, the pitch can be changed to affect the travel rate. For example, a pitch of 6" travels only 6" per revolution but the same rotation speed with a 12" pitch will travel 12" in the same amount of time. Accordingly, the pitch design can be based on the tire material bio-mass or the speed of travel desired.

The paddle design is generally a staggered paddle flight design. A "stagger" refers to where a first flight ends, the overlapping flight is rotated 180 degrees from the first flight end, and is pulled back (overlapping) into the first flight, making it staggered pitch. The pulse rotary conveyer 800 periodically pauses which allows the tire crumb material to build up more heat as opposed to conventionally moving continuously, while being easily moved through the length of the reaction chamber 120 towards the outlet side. Utilizing the rotary pulse conveyer allows the material to flow into the reactor chamber more consistently, while allowing significantly increased heat transfer within the tire crumb feedstock itself by allowing the material to stop between conveyer flights to build up heat and prevent build up on the conveyer flights or in the reactor chamber 120.

For one particular example, the diameter of the reactor chamber 120 is 24", the pulse rotary conveyer 800 is 20" in diameter. Pulse rotary conveyer 800 generally runs at about 1 RPM to 15 RPM (based on the drive selected) which provides a retention time of the tire crumb in the reactor chamber 120 between about 0.01 minute and 1 minute.

One example method is now described how to manufacture disclosed pulse rotary conveyers. A 3"×½" flat bar is spiral rolled to the desired diameter and spacing (angle/pitch). Pipe spokes are welded to the drive shaft 805 (4" schedule 80 pipe) spaced to match the ribbon spacing but every 120 degrees apart. The ribbon 806 is welded to the top of the spokes. The next set of spokes are staged back half the pitch of the ribbon 806 and 180 degrees around and are then welded solid, continuing to the end of the drive shaft 805. The solid shafts are then bolted to each end to implement desired lengths.

Figure 9A:
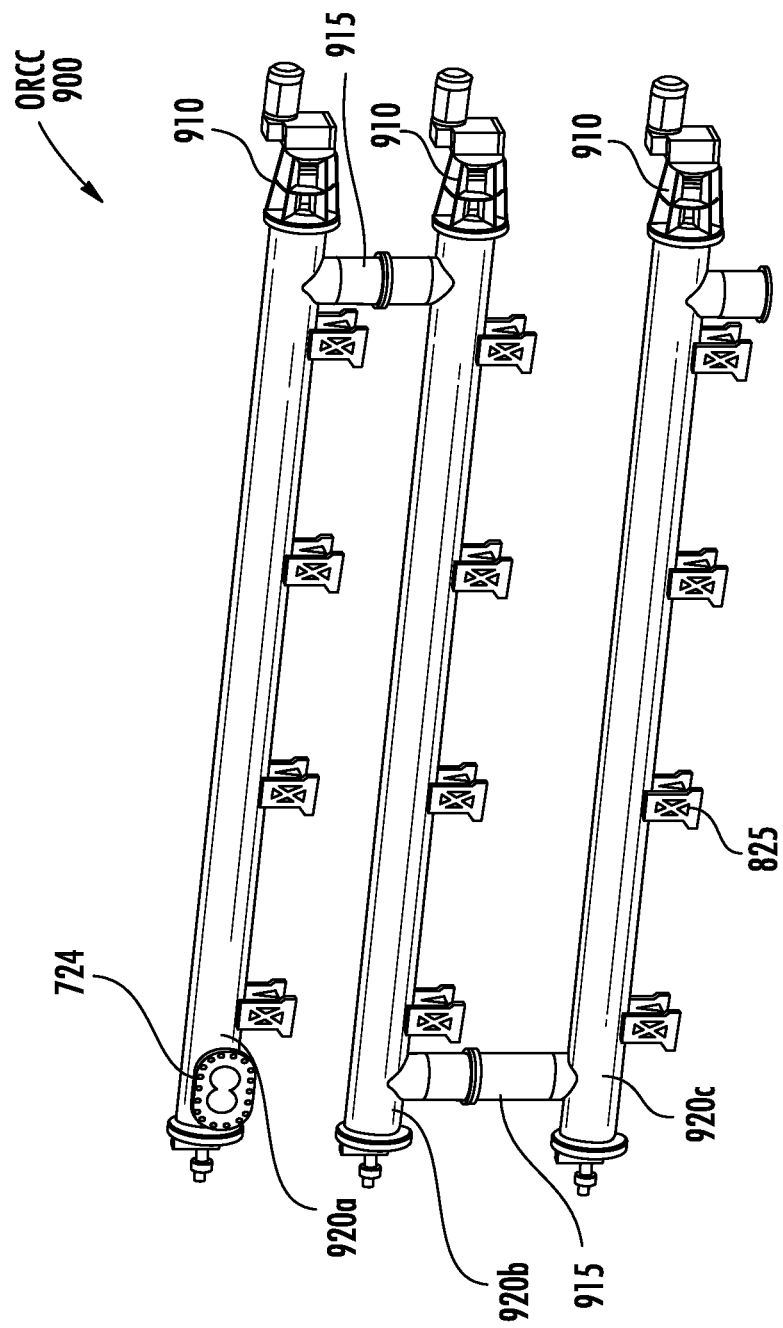
FIG. 9A is a schematic view showing an example over-under reactor chamber configuration (ORCC)

FIG. 9A is a schematic view showing an example over-under reactor chamber configuration (ORCC) 900, according to an example embodiment. In this configuration there are a plurality of reactor chambers shown as 920a, 920b and 920c stacked vertically on one another that are interconnected to one another by vertical pipe connections 915 which are shown alternating from being on the right side between reactor chambers 920a and 920b, and being on the left side between reactor chambers 920b and 920c. Each reactor chamber is shown having a VFD 910 that drives a screw conveyer/auger, such as the pulse rotary conveyer 800 shown in FIG. 8A. Four expansion and support carts (expansion carts) 825 are shown for each reactor chamber. Expansion carts 825 are generally welded to the reactor chambers 920a, 920b, and 920c and are configured to control alignment and supported movement of the reactor chambers 920a, 920b and 920c.

Reactor chambers 920*a* being the top reactor is shown having a bushing retainer collar 724 that as described above acts as a flange and provides a material input port configured so that a force feed auger continuously feeds tire crumb via a center opening. Tire material moves left to right in reactor chamber 920*a*, enters the right side of reactor chamber 920*b* through a vertical pipe connection 915, travels right to left, enters the right side of reactor chamber 920*c* through a vertical pipe connection 915, and travels left to right. All reactor chambers 920*a*, 920*b* and 920*c* have their own outlets including a flue pipe and an outlet for outputting solid pyrolysis products.

The floating design of ORCC 900 provides support for the reactor chambers 920*a*, 920*b* and 920*c* while allowing for lateral expansion. The dual-contact of the expansion carts 825 prevents warping of the main housing and allows for flotation to permit motion in both directions. The expansion carts 825 generally have a cam follower roller that set on top and bottom of a flat bar that is part of the frame 1210 shown in FIG. 12B. The cam followers stop the expansion carts 825 from moving up or down, and the expansion carts 825 are placed between the flat bars on the heat sink fins and hoop supports (HSF) 1010 shown in FIG. 10A described below. This stops the expansion carts 825 from moving side to side. The expansion carts 825 then hold the reactor chambers 920*a*, 920*b*, and 920*c* from moving up, down and side to side, only allowing left to right movement as the reactor chambers 920*a*, 920*b*, and 920*c* expand from heat.

For a given reactor length needed, ORCC 900 reduces the length of the reactor chamber by the number of reactor chambers provided, and thus the area footprint of the system. Reduced length is recognized to significantly reduce the amount of thermal expansion of overall system which significantly increases the efficiency of heat transfer throughout the metal (e.g., stainless steel) walls of reactor chambers 920*a*, 920*b* and 920*c*.

Efficiency is increased as a shorter design allows for less heat loss because of less overall thermal expansion, since the longer an object gets when heated, the more area to keep hot. The shorter the object, the less expansion and less area to keep hot. Additionally, ORCC 900 increases overall strength of the system and provides easier regular maintenance access. Moreover, it has been discovered because ORCC 900 significantly reduces the length of the reactor, the amount of thermal expansion of the system during heating is reduced and ultimately increases the strength and longevity of the system, such as due to reduced stress on the screw sections and drives. This configuration also provides the flexibility of different reactor chamber temperatures and speed.

Figure 9B:
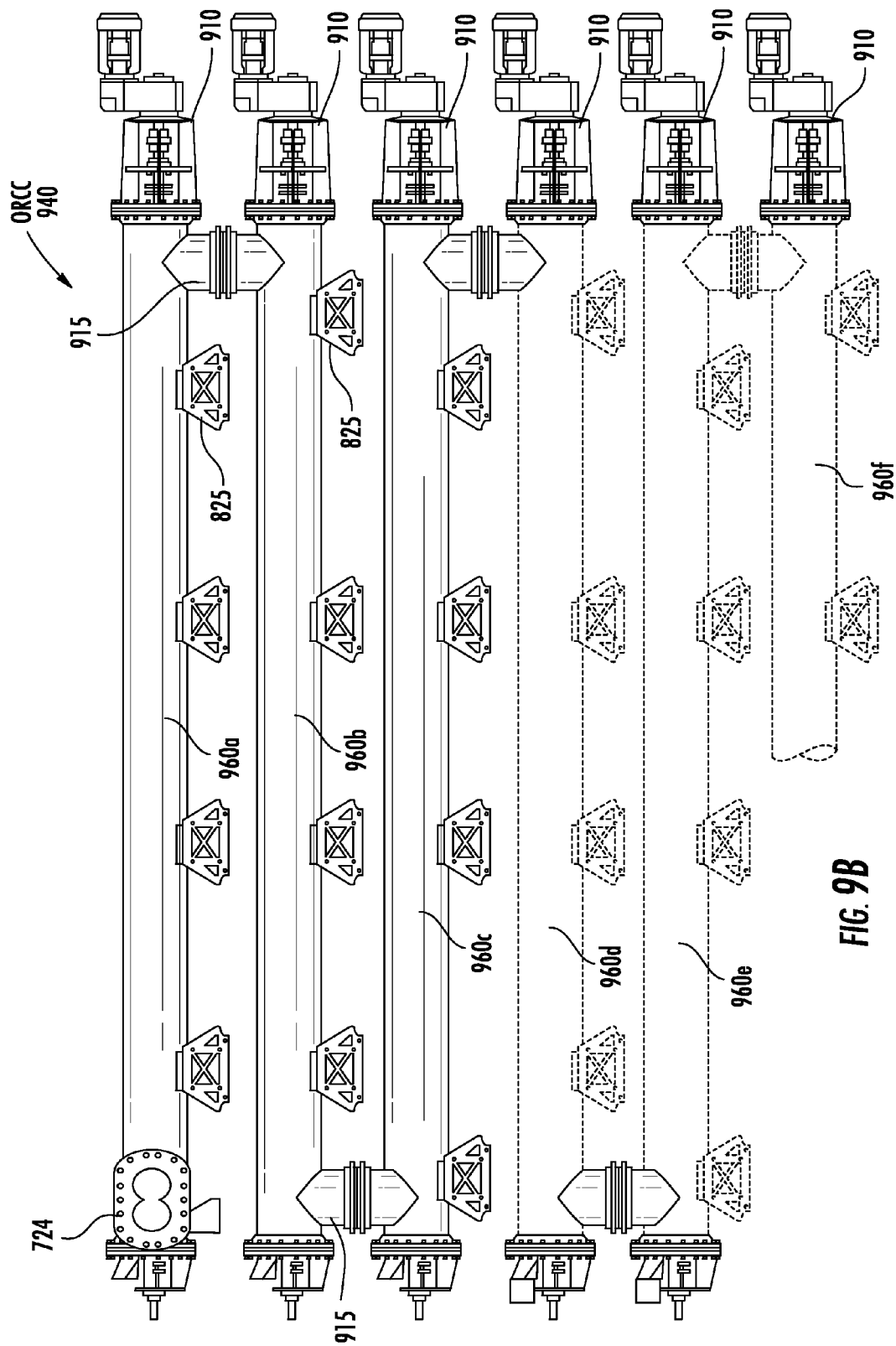

FIG. 9B shows another ORCC shown as ORCC 940 that is used to explain tube expansion advantages of disclosed ORCC's. ORCC 940 is shown having six reactor chambers 960*a*, 960*b*, 960*c*, 960*d*, 960*e* and 960*f* stacked vertically on one another connected together by vertical pipe connections 915, with reactor chamber 960*a* being referred to as the top reactor chamber. Reactor chambers 960*d*, 960*e* and 960*f* are shown unshaded (with dashed lines) to indicate they are optionally added to show future possibilities. As in FIG. 9A, tire material alternates in the reactor chambers between moving light to right and moving right to left.

When the top reactor chamber 960*a* is heated during operation (e.g., 450° and 700° C., such as to 500° C. in one particular embodiment), assume given the temperature and the reactor chamber composition (e.g., 310 steel) the top reactor chamber 960*a* will expand in length six inches. This movement is supported by expansion carts 825 which include rollers. Because of this movement, the nearby reactor chambers 960*b* and 960*c* to the top reactor chamber 960*a* are pulled by force exerted by the vertical pipe connections 915 between them. As reactor chamber 960*b* is heated, it expands about 6.5 inches (longer). The last reactor chamber such as reactor chamber 960*c* for a vertically stacked three reactor system is the end of the processing system so to insure no fuel discharges with the carbon ash, the temperature can be bumped up to vaporize any remaining fuel. If the entire reactor was at that temperature, it would likely damage the fuel.

If the top reactor chamber 960*a* expands say 6" ("used herein for lengths refers to inches that=2.54 cm) to the right and it pulls the reactor chamber 960*b* with it via 915 connection then reactor chamber 960*b* has moved 6" to the right too. But when reactor chamber 960*b* is heated and expands 6", it will expand to the left. Thus moving back to the start length on the left. Now reactor chamber 960*c* is moved back 6.5 inches along with reactor chamber 960*f*. When the reactor chamber 960*c* is heated, it expands about 7.75 inches and thus moves a little past the reactor chambers 960*b* and top reactor chamber 960*a* above it. This pattern will continue if more reactor chambers are added and the heat remains the same.

Figure 9C:
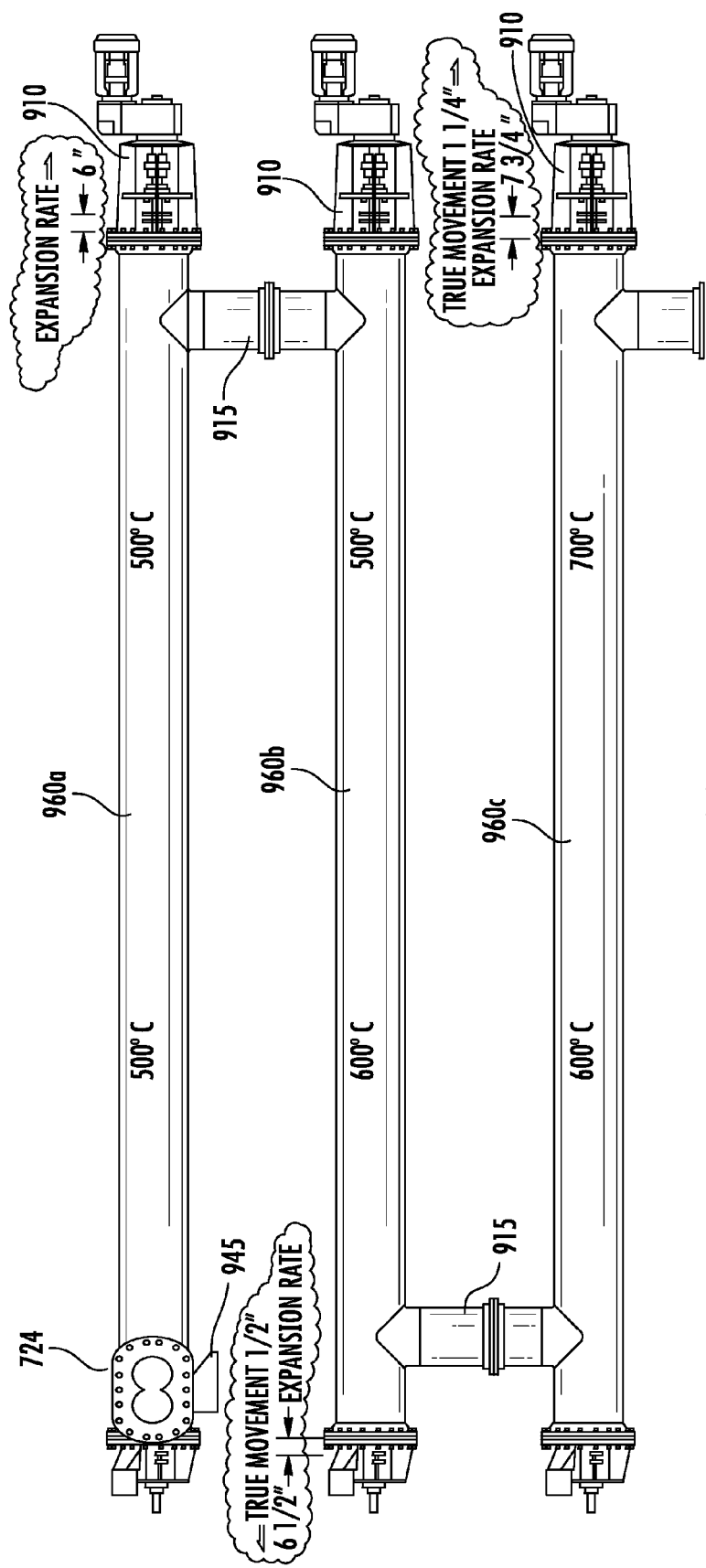
FIG. 9C shows reactor chambers of the ORCC in FIG. 9B along with further thermal expansion rate description and example temperatures within the reactor chambers, according to an example embodiment.

FIG. 9C shows the top reactor chamber 960*a*, and reactor chambers 960*b* and 960*c* of the ORCC in FIG. 9B along with further thermal expansion rate description and example temperatures within the reactor chambers. The temperature is ramped up monotonically as it flows to remove the largest amount of fuel with the least amount of temperature. Feature 945 shown is a support brace which can brace to a frame, such as frame 1210 described below relative to FIGS. 12B-12D. Example thermally driven reactor chamber movements and expansion rates are shown in FIG. 9C.

Figure 10A:
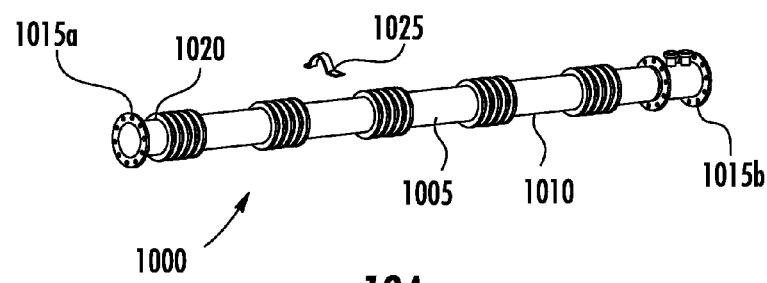
FIG. 10A is a schematic view showing an assembled example internal condenser.

FIG. 10A is a schematic view showing an assembled example internal condenser 1000, according to an example embodiment. Internal condenser 1000 can replace the conventional heat exchanger/condenser shown as a fuel condenser 130 for the tire recycling system 100 in FIG. 1. Conventional condensers for tire recycling are external condenser systems having external water jackets that naturally lose heat from surface exposure. In contrast, internal condenser 1000 includes an inside water feed tube 1040 (see FIGS. 10B and 10C) which rapidly condenses fuel vapors internally, reduces waste and energy, and maximizes the surface area of the condenser. Quicker heat removal from the hi-velocity water exchange system cools the fuel vapors faster, resulting in higher conversion rates. In addition, disclosed internal condensers reduce waste and energy needed within and during the conversion of gaseous feedstock state into liquid fuels.

The configuration of internal condenser 1000 can increase the surface area of the condenser by approximately 300% as compared to conventional condensers by removing heat much more rapidly through a high velocity water exchange, thus saving significant electrical energy consumption for generating cold water). Since the water feed tube 1045 is inside the internal condenser 1000 verses a conventional condenser that has an outside water jacket, essentially 100% of the water is in thermal contact with the fuel vapors. The use of an inline daisy chain configuration (describe) design allows for multiple temperature condenser.

Variable controlled water temperature, and the enlarged outer housing (outer housing) 1005 reduces the flow rate and prevents the gas from crystallizing due to thermal shock. Internal condenser 1000 includes a thin walled metal outer housing 1005, HSF 1010, end flanges 1015 that can comprise American National Standard Institute (ANSI) compliant flanges, and a backwash system 1020 including a backwash port which uses collected fuel and provides a closed loop flow, which prevents the loss of collected fuel. The backwash system 1020 allows for self-cleaning to operate more efficiently, and reduces the need for service.

The outer housing 1005 is generally constructed from thin wall material to allow for natural heat loss. The field support band 1025 can be used to secure internal condenser 1000. In operation, fuel vapors enter internal condenser 1000 on an inlet side end flange 1015a and liquid fuel product exits on an outlet side end flange 1015b on the opposite end of the internal condenser 1000.

Figure 10B:
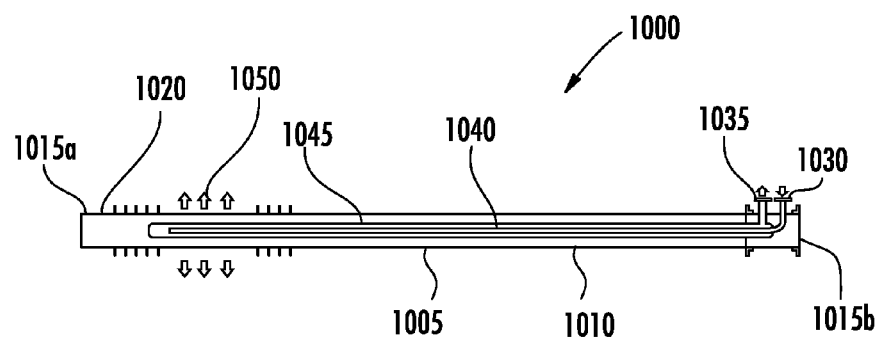
FIG. 10B is a cut-away view of the internal condenser shown in FIG. 10A.
Figure 10C:
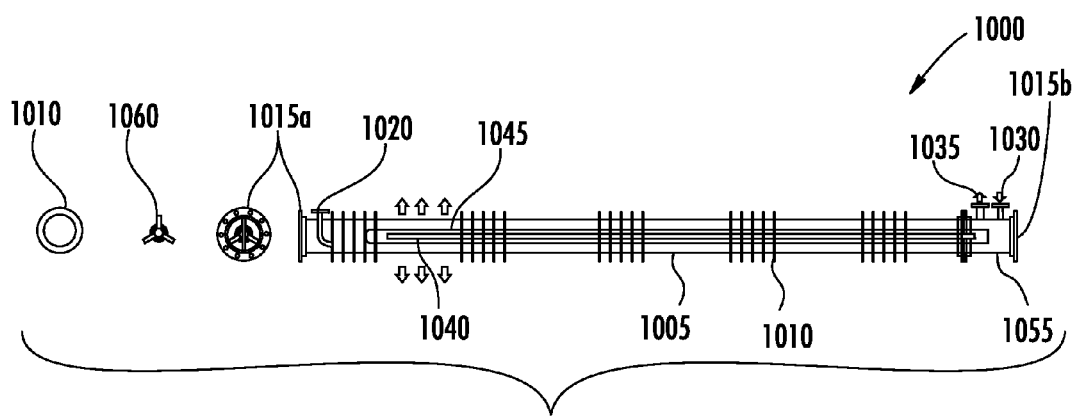
FIG. 10C is a partially exploded view depiction of the internal condenser shown in FIG. 10A, according to an example embodiment.

FIG. 10B is a cut-away view of the internal condenser 1000. Internal condenser 1000 is shown including a water inlet 1030 and a water outlet 1035 and inside water feed tube 1040 and an outside water return tube 1045. Radiant heat is shown by arrows labeled as 1050. FIG. 10C shows a partially exploded view depiction of an example internal condenser 1000. The water inlet 1030 and water outlet 1035 are shown within a port housing tube 1055. In the exploded portion HSF 1010, support spacer 1060 and inlet side end flange 1015a are shown.

A stacked internal condenser design can also be provided. One internal condenser 1000 can be bolted to another internal condenser 1000. A stacked internal condenser configuration allows for different condenser temperatures and a longer exposure time. The internal temperatures can be changed by changing the water velocity. The longer the chilled water stays inside the housing, the warmer it gets, thus reducing the temperature difference. As an option, multiple cooling tubes can be added for added cooling surface. Air deflector baffles can also be added to add air disturbance and slow the velocity and add to the exposure time.

Figure 11A:
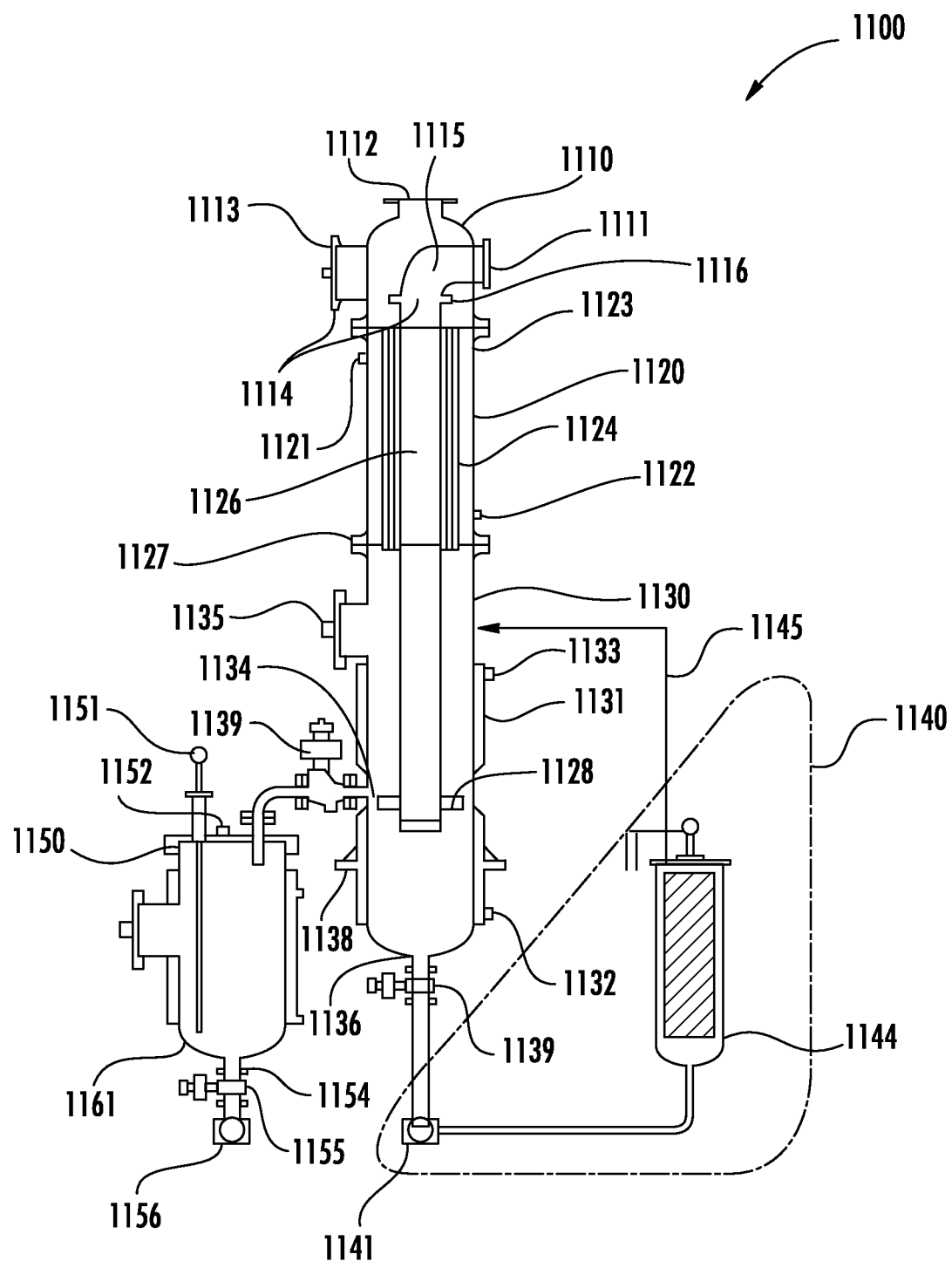
FIG. 11A is a cut-away depiction of an example fuel collector, separator, and cleaner combination (FCSC combination)
Figure 11B:
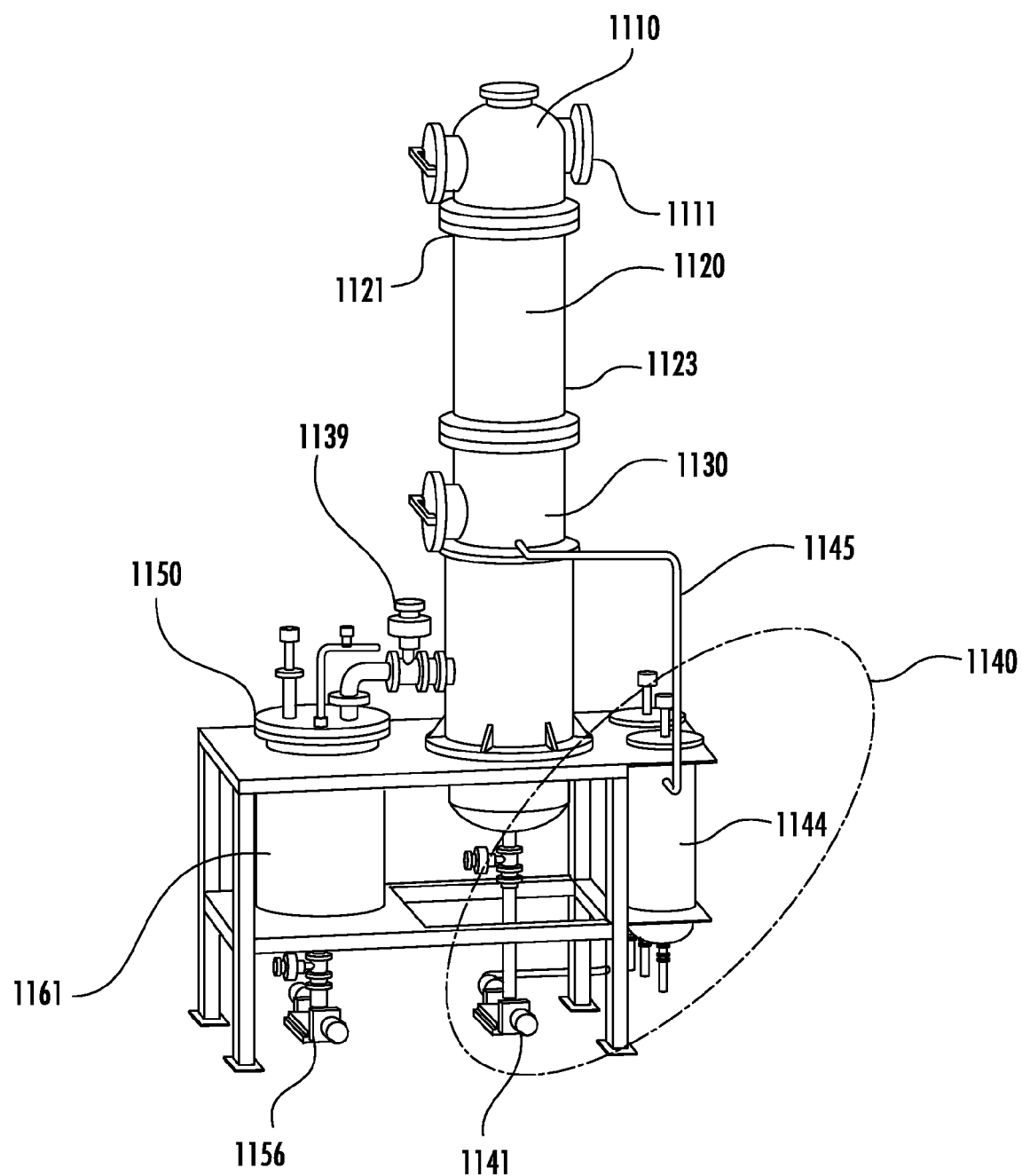
FIG. 11B is an assembled view of the example FCSC combination.

FIG. 11A is a cut-away depiction of an example fuel collector, separator, and cleaner combination (FCSC combination) 1100, according to an example. FCSC combination 1100 provides fuel collection, fuel cleaning and scrubbing effectively providing a mini-on site fuel refinery. FCSC combination 1100 can replace the collection tank 140 shown in FIG. 1. FCSC combination 1100 includes fuel collection cap 1110 in its upper section, fuel collection condenser section 1120, an fuel jacket separator system 1130 in its lower section, as well as fuel filtering and collection system 1140 and fuel collection spill-over tank 1150. FCSC combination 1100 is also depicted in FIG. 11B as assembled. The fuel collection, cleaning and scrubbing provided by disclosed FCSC combination 1100 can significantly improve the quality of liquid fuels by separating heaving hydrocarbon chains from light and mid hydrocarbon chain liquid fuels, resulting in significantly higher quality oils that require less distillation processes as compared to known systems.

Fuel collection cap 1110 includes gas vapor inlet port 1111 that receives fuel vapors from the flue of a reactor chamber, vacuum port outlet 1112, hinged access port 1113, first flange 1114, gas vapor elbow 1115, and second flange 1116. Fuel collector condenser section 1120 is a shell-and-tube condenser for both in-coming gases provided in gas vapor tube 1126 and out-going gases which are non-condensable gases such as methane which is outputted through the vacuum port outlet 1112. Fuel collection condenser section 1120 includes cooling water outlet port 1121, cooling water inlet port 1122, condenser end plate 1123, a plurality of condenser tubes 1124, vent holes for gas vapors 1125 (not shown), gas vapor tube 1126, flange 1127, and bubbler retention plate 1128 with gas vapor bubbles 1129 (not shown) at the bottom of the gas vapor tube 1126 shown to represent the liquid fuel condensed.

Gas vapor inlet port 1111 is coupled to the gas vapor tube 1126. In the lower section of FCSC combination 1100 is a fuel collection separator system 1130 that includes a main bubbler tank 1130a, water jacket 1131, cooling water inlet port 1132, cooling water outlet port 1133, fuel over-spill port outlet 1134, hinged access port 1135, solids collection outlet port 1136, flange 1137, welded support ring 1138, and auto shut-off valve 1139. The fuel collection separator system 1150 functions as a separator and the fuel pull of tank is the vacuum airlock.

Fuel filtering and collection system 1140 is shown including material slurry pump 1141, filter tank 1144, and cleaned fuel return pipe 1145. Fuel collection spill-over tank system 1150 is shown including spill-over tank 1161, a level transmitter 1151, vacuum relief port 1152, valve access port 1152, fuel outlet port 1154, auto shutoff valve 1155, fuel pump 1156, welded support ring (not shown), cooling water outlet port 1158, and cooling water inlet port 1159.

In operation, fuel spills out of the fuel collector condenser section 1120 at the fuel over-spill port outlet 1134 and fills the spill-over tank 1161 of the spill-over tank system 1150. When the spill-over tank 1161 needs to be drained, the auto shutoff valve 1139 closes and auto shutoff valve 1155 opens. Syn-gas for volume displacement is pushed into spill-over tank 1161 through valve access port 1152. The fuel pump 1156 shown drains the spill-over tank 1161 and then stops. Auto shutoff valve 1155 is closed and auto shutoff valve 1139 opens. The cycle then starts over.

Figure 11C:
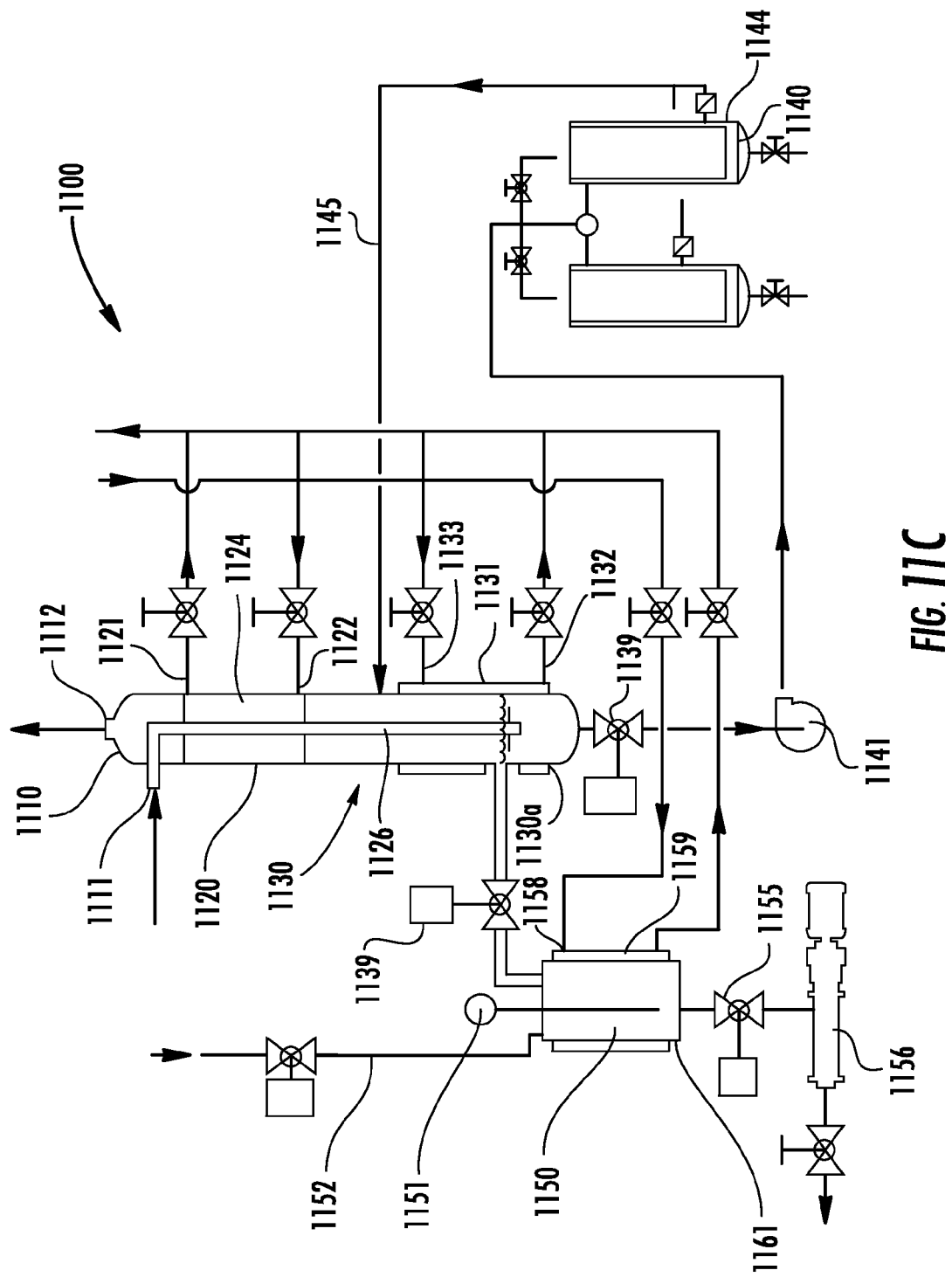
FIG. 11C is a fuel collection schematic for the FCSC combination, according example embodiments.

FIG. 11C is a fuel collection schematic for an example FCSC combination 1100. Gas vapor enters FCSC combination 1100 at the gas vapor inlet port 1111 coupled to gas vapor tube 1126. The plurality of condenser tubes 1124 of the fuel collection condenser section 1120 being water cooled cools the gas vapors as they travel in the gas vapor tube 1126 to provide collected liquid fuel that accumulates at the bottom of the main bubbler tank 1130a. Relatively heavy ash particles are removed from the collected fuel by way of liquid contact in main bubbler tank 1130a as the liquid saturates the ash and it is no longer airborne. This prevents the ash laden air from interning into the vacuum source acting, like an air filter for the vacuum source. Secondly, the material slurry pump 1141 provides material separation, allowing heavy ash to drop to the bottom of the main bubbler tank 1130a.

The lighter fuel fills the main bubbler tank 1130a and is allowed to spill into spill-over tank 1161 beside it. The inlet to the spill-over tank 1161 receives fuel from mid-way up within the main bubbler tank 1130a where the lighter cleaner fuel is. The fuel pump 1156 is 1156 equipped with a valve group including auto shutoff valve 1155 and auto shutoff valve 1139 that allows the fuel to be removed from the vacuum area and moved to a collection tank indicated by the arrow shown to the left of the fuel pump 1156 in FIG. 11C. The pump tank spill over port maintains the liquid in the main bubbler tank 1130a so that the liquid level remains at an essentially fixed level for the bubbler to work at the same pressure.

The fuel collection condenser section 1120 provides cooling for both the inlet gas of the main bubbler tank 1130a and the outlet gas from the main bubbler tank 1130a. As the outlet gasses are condensed in the fuel condenser section, the condensed fuel drips down into the main bubbler tank 1130a. This fuel increases its level in the main bubbler tank 1130a and reaches a level where it spills over into the spill-over tank 1161.

The fuel filtering and collection system 1140 is a closed loop system with respect to the main bubbler tank 1130a. The heaver ash laden fuel is pulled from the bottom of the main bubbler tank 1130a by material slurry pump 1141 through a filter (not shown) in series with the filter tank 1144. The ash is trapped in this filter and the fuel is returned from the filter tank 1144 to the main bubbler tank 1130a by cleaned fuel return pipe 1145. This returned fuel is also shown used to backwash the fuel collection condenser, section 1120 that can comprise the internal condenser shown in FIGS. 10A-10C, as slow moving ash laden vapors will tend to deposit ash inside the condenser.

Figure 12A:
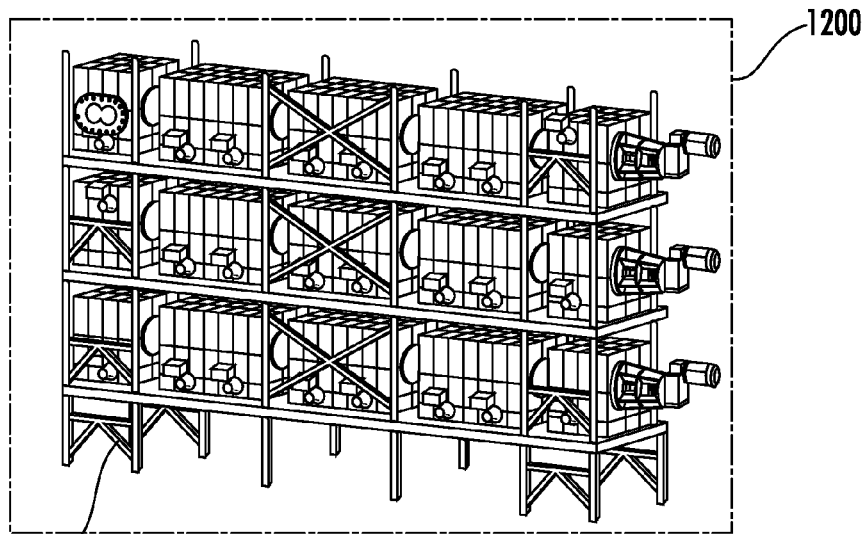
FIG. 12A is a schematic view showing an example modular designed tire recycling system including separate reactor sections (or modules) each having a modular frame.
Figure 12B:
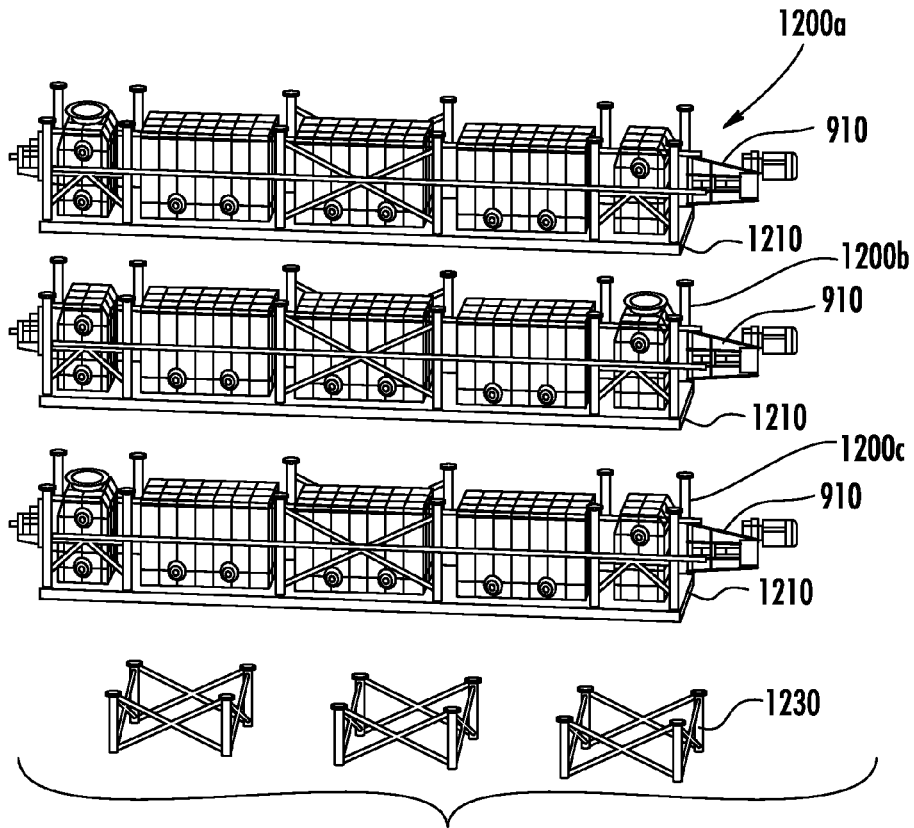
FIG. 12B shows the sub-systems separated from one another.

FIG. 12A is a schematic view showing an example modular designed tire recycling system 1200 including separate reactor sub-systems (sections or modules) 1200a, 1200b and 1200c each having a modular frame 1210, according to an example embodiment. FIG. 12B shows the sub-systems 1200a, 1200b and 1200c separated from one another. The modular design provided decreases reactor length, allowing for far superior heat transfer through the reactor chamber, decreasing cold spots in the generally steel reactor chamber and thus decreasing dwell time from beginning. The modular construction design also reduces the fabrication and installation cost. The reactor sections utilize identical connections on the top and bottom along with from left to right. This allows the reactor sections to stack or flip around as needed. Also the modular drive support expansions carts 1230 reduces maintenance time. Easy access to all components make service faster. Having the same components reduces spare parts and allows purchase in larger quantities reducing the price.

The modular construction design makes the system easily expandable without increasing the footprint of the reactor. Each reactor section is mounted on a skid style. Skid style has all components pre-mounted so that the components can be moved to the location all together. Frame 1210 that encompasses the reactor housing and expansions carts. Each reactor section along with the modular frame 1210 will generally fit inside a shipping container. Each reactor sub-system 1200a, 1200b and 1200c can be complete with heater bands, thermo coupling, insulation, VFD 910 and all wiring pre-mounted at the fabrication shop before shipping.

The reactor sections are generally all the same dimensions and bolt patterns to create the stackable design. The only anchor point on the reactor sections is generally the inlet section. The second or third stage expands and is allowed to move. This design allow for capacity rate change by adding another reactor section stack while keeping all the support equipment as is, as well as providing easy access maintenance to any part of the system. The drive end (right side as shown) of the reactor sections also floats with the expansion. The drive mount is designed to reduce service time by maintaining the coupling alignment while access the main reactor screw. This drive mount has forklift access supports for easy service. The generally steel support frame reduces fabrication cost by using repeatable dimensions.

All vertical members can be the same material and same dimension. All main cross members can be the same material and dimensions. All support carts are a quick lock snap together design to insure alignment before welding. This speeds up fabrication and reduces the changes of misalignment of the reactor. The expansion carts can be connected in two locations on the main reactor chambers where needed. These two connections prevent the main reactor chamber from warping out of alignment. The cam followers are generally locked to the steel frame to prevent lift or descent of the alignment.

Figure 12E:
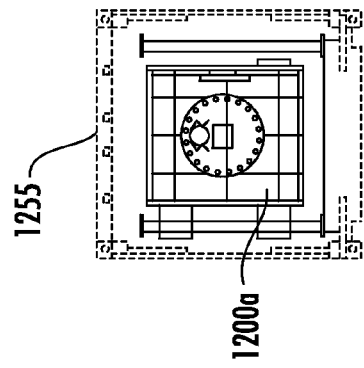
FIG. 12E is an end elevation view of a complete assembled reactor section shown in a shipping container, all according to example embodiments.
Figure 12C:
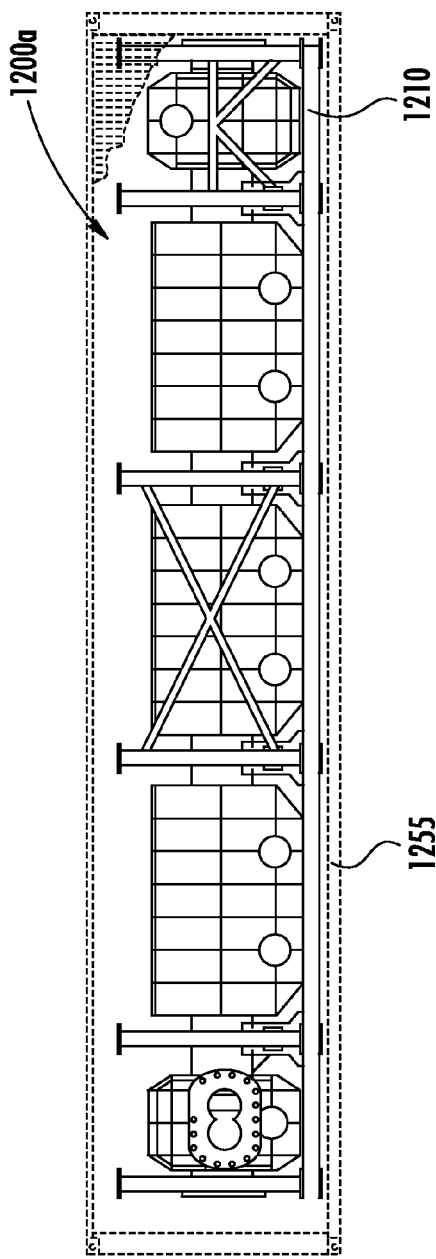
FIG. 12C is a view of an example of a complete assembled reactor section shown in a shipping container.
Figure 12D:
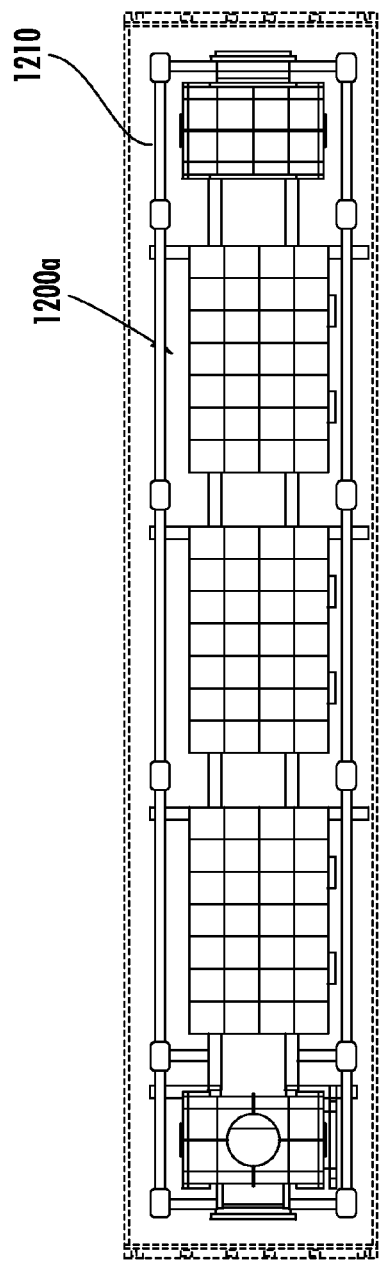
FIG. 12D is a plan view of an example of a complete assembled reactor section in a shipping container.

FIG. 12C is a view of an example of a complete assembled reactor sub-system shown as 1200a in a shipping container 1255, such as a 40 ft. shipping container. FIG. 12D is a plan view of an example of a complete assembled reactor sub-system shown as 1200a in a shipping container 1255. FIG. 12E is an end elevation view of the side opposite VFD 910.

The VFD 910 shown in FIG. 12B will generally not be mounted because of room and vibration shock in shipping can break the drive housing. Matching bolt plates are generally welded on the bottom side of the frame to match the next module below. Legs can be replaced with longer leg if needed. Frames can be symmetrical for duplicate fabrication. All leg section can be the same length for mass production.

Through the combination of the above-described sub-systems, the entire process, system and sub-system performance are significantly more efficient, thus producing much higher quality of ASTM quality liquid fuels, carbon char and synthetic methane syngas, while maximizing throughput output as well as producing emissions below EPA and state regulatory maximums. Disclosed sub-systems that provide respective process step enhancements may allow for a facility to be profitable without any government subsidy.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. A gas processor, comprising:
   a burner chamber including a first end and a second end;
   a gas/fuel burner having an inlet receiving air and an inlet for receiving a first combustible gas including a nozzle providing a flame extending out from said nozzle;
   a syn-gas chamber having injection holes including a syn-gas feed line and a syn-gas nozzle plate coupled between said second end of said burner chamber and said gas/fuel burner including over said nozzle, wherein syn-gas is directed by said injection holes into a path of said flame for combustion of said syn-gas;
   an air pipe having a plurality of air pipe discharge ports extending from said first end to within said burner chamber having an air blower coupled thereto configured to pump air into said burner chamber, and
   an air blast plate having baffles positioned under said plurality of air pipe discharge ports.

2. The gas processor of claim 1, wherein said air pipe comprises a plurality of protruding heat fins.

3. The gas processor of claim 1, comprising a first temperature sensor for sensing a temperature over a reactor chamber being heated by radiant heat from said gas processor and a fan controller which receives said temperature from said first temperature sensor configured to regulate a flow of air provided by said air blower.

4. The gas processor of claim 1, wherein said burner chamber includes a second temperature sensor therein, and wherein said gas/fuel burner comprises a modulation damper operable to change a flow of air through said inlet receiving air based on a temperature reading from said second temperature sensor.

5. The gas processor of claim 1, further comprising a system for pyrolizing tires, said system comprising:
   a reactor including a pyrolysis (reactor) chamber including at least one heater having a pyrolysis zone, an inlet and outlets on respective sides of said pyrolysis zone, said outlets including a flue pipe and a second outlet;

a feed system for transferring feedstock comprising tire pieces received from a feed source into said inlet;

a conveyer for moving material associated with said tire pieces through said reactor chamber;

wherein pyrolysis performed in said reactor chamber pyrolizes said feedstock to generate solid material and hydrocarbon gases including ash particles, a condenser coupled to said flue pipe for liquefying said hydrocarbon gases before collection in a collection tank, and an outlet conveyor for transferring said solid material from said second outlet to a recovery hopper, wherein said burner chamber of said gas processor is positioned proximate to said reactor chamber to provide radiant heat for heating said reactor chamber.

6. The gas processor of claim 5, further comprising a heat box surrounding both said reactor chamber and said burner chamber, and an air blast plate under said burner chamber, wherein air entering into said heat box through said air pipe discharged by said plurality of air pipe discharge ports is distributed essentially evenly under said burner chamber by said air blast plate.

7. The gas processor of claim 1, wherein said syn-gas chamber is a coaxial syn-gas chamber including inner and outer metals cylinders wherein said syn-gas received from said syn-gas feed line travels laterally in a gap between said metals cylinders before being injected through said injection holes.

8. The gas processor of claim 1, wherein said gas processor is a modular design including a plurality of gas processor modules (gas modules) coupled end-to-end to one another by coupling structures configured to allow movement of said plurality of gas modules.

9. A method of gas processing, comprising:

receiving air and a first combustible gas at a first end of a gas/fuel burner including a nozzle providing a flame extending out from said nozzle;

using a syn-gas chamber having injection holes including a syn-gas feed line and a syn-gas nozzle plate coupled between a second end of a burner chamber and said gas/fuel burner including over said nozzle, directing syn-gas received from said syn-gas feed line through said injection holes into a path of said flame for combustion of said syn-gas;

while combusting said syn-gas:

pumping air into said burner chamber using an air pipe having a plurality of air pipe discharge ports extending from said first end to within said burner chamber having an air blower coupled thereto configured to pump said air into said burner chamber to cool said burner chamber, and sensing a temperature over a reactor chamber being heated by radiant heat from said combustion of said syn-gas and a fan controller which receives said temperature from a first temperature sensor regulating a flow of said air provided by said air blower.

10. The method of claim 9, wherein said air pipe comprises a plurality of protruding heat fins.

11. The method of claim 9, wherein said burner chamber includes a second temperature sensor therein, and wherein said gas/fuel burner comprises a modulation damper, changing a flow of said air received by said gas/fuel burner based on a temperature reading from said second temperature sensor.

12. The method of claim 9, wherein said burner chamber is positioned proximate to a reactor chamber of a system for pyrolizing tires to provide radiant heat for heating said reactor chamber.

13. The method of claim 9, wherein said burner chamber is positioned proximate to a reactor chamber of a system for pyrolizing tires to provide radiant heat for heating said reactor chamber, further comprising a heat box surrounding both said reactor chamber and said burner chamber, and an air blast plate under said burner chamber, wherein air entering into said heat box through said air pipe discharged by said plurality of air pipe discharge ports is distributed essentially evenly under the burner chamber by said air blast plate.

14. A system for pyrolizing tires, comprising:

a reactor including a pyrolysis (reactor) chamber including at least one heater having a pyrolysis zone, an inlet and outlets on respective sides of said pyrolysis zone, said outlets including a flue pipe and a second outlet;

a feed system for transferring feedstock comprising tire pieces received from a feed source into said inlet;

a conveyer for moving material associated with said tire pieces through said reactor chamber;

wherein pyrolysis performed in said reactor chamber pyrolizes said feedstock to generate solid material and hydrocarbon gases including ash particles, a condenser coupled to said flue pipe for liquefying said hydrocarbon gases before collection in a collection tank, and an outlet conveyor for transferring said solid material from said second outlet to a recovery hopper;

a gas processor, comprising:

a burner chamber including a first end and a second end positioned proximate to said reactor chamber to provide radiant heat for heating said reactor chamber;

a gas/fuel burner having an inlet receiving air and an inlet for receiving a first combustible gas including a nozzle providing a flame extending out from said nozzle;

a syn-gas chamber having injection holes including a syn-gas feed line and a syn-gas nozzle plate coupled between said second end of said burner chamber and said gas/fuel burner including over said nozzle, wherein syn-gas is directed by said injection holes into a path of said flame for combustion of said syn-gas, and an air pipe having a plurality of air pipe discharge ports extending from said first end to within said burner chamber having an air blower coupled thereto configured to pump air into said burner chamber, and a heat box surrounding both said reactor chamber and said burner chamber, and an air blast plate under said burner chamber, wherein air entering into said heat box through said air pipe discharged by said plurality of air pipe discharge ports is distributed essentially evenly under said burner chamber by said air blast plate.

\* \* \* \* \*